United States Patent [19]
Tonkin

[11] Patent Number: 6,133,852
[45] Date of Patent: *Oct. 17, 2000

[54] MOTOR VEHICLE SYSTEM AND RANGING DEVICE

[75] Inventor: Mark Christopher Tonkin, Lewes, United Kingdom

[73] Assignees: Design Technology; Innovation Limited, both of Sussex, United Kingdom

[ * ] Notice: This patent is subject to a terminal disclaimer.

[21] Appl. No.: 09/192,626

[22] Filed: Nov. 16, 1998

Related U.S. Application Data

[63] Continuation of application No. 08/754,415, Nov. 22, 1996, Pat. No. 5,838,259, which is a continuation-in-part of application No. 08/284,540, Aug. 5, 1994, Pat. No. 5,828,319.

[51] Int. Cl.[7] ........................................... G08G 1/16
[52] U.S. Cl. ........................... 340/903; 340/464; 340/479
[58] Field of Search .................................... 340/463, 464, 340/466, 467, 468, 472, 479, 903

[56] References Cited

U.S. PATENT DOCUMENTS

| | | |
|---|---|---|
| 4,467,313 | 8/1984 | Yoshino et al. . |
| 4,626,850 | 12/1986 | Chey . |
| 4,868,719 | 9/1989 | Kouchi et al. ........................... 340/479 |
| 4,985,953 | 1/1991 | Page ........................................ 340/479 |
| 5,089,805 | 2/1992 | Salsman ................................... 340/467 |
| 5,172,095 | 12/1992 | Scott ....................................... 340/479 |
| 5,298,882 | 3/1994 | Tsai ........................................ 340/468 |
| 5,481,263 | 1/1996 | Lurie et al. .............................. 340/467 |
| 5,610,578 | 3/1997 | Gilmore .................................. 340/479 |
| 5,856,793 | 1/1999 | Tonkin et al. ........................... 340/479 |

FOREIGN PATENT DOCUMENTS

| | | |
|---|---|---|
| 0 263 262 A2 | 8/1987 | European Pat. Off. . |
| 0263262 A2 | 8/1987 | European Pat. Off. . |
| 0263262 A3 | 8/1987 | European Pat. Off. . |
| 3907714 A1 | 3/1989 | Germany . |
| 40 20 610 A1 | 6/1990 | Germany . |
| 3907714 A1 | 9/1990 | Germany . |
| 40 20 610 A1 | 1/1992 | Germany . |
| 60197442 | 10/1985 | Japan . |
| 8300073 | 1/1983 | Netherlands . |
| 2114826 | 1/1982 | United Kingdom . |
| 2 114826 | 8/1983 | United Kingdom . |
| 91/07672 | 11/1990 | WIPO . |

OTHER PUBLICATIONS

Armour and Carter, "Multi–brakelight array control equipment," Road Research Laboratory, Department of the Environment RRL Report LR 374 (1971).

Rutley and Mace, "An evaluation of a brakelight display which indicates the severity of braking," Road Research Laboratory, Department of the Environment RRL Report LR 287 (1969).

*Primary Examiner*—Edward Lefkowitz
*Attorney, Agent, or Firm*—Needle & Rosenberg, P.C.

[57] ABSTRACT

A display system for motor vehicles provides an array of lamps at the rear of a subject vehicle to provide an indication of the state of motion of the subject vehicle to the driver of a following vehicle. In a first mode of operation, the display indicates a level of warning dependent upon the rate of deceleration of the subject vehicle, the level of warning being determined by deceleration thresholds which are variable in dependence upon the measured speed of the subject vehicle. In a second mode of operation, the lamps provide an indication of the subject vehicle being stationary or near stationary as determined by comparing the measured speed with a threshold speed. An animate display is created by illuminating the lamps and sequentially deactuating selected pairs of lamps to create a pattern cyclically moving semetrically outwardly from the centre of the row. The display is discontinued when the speed of the subject vehicle exceeds a second threshold defined independently of the first threshold speed. In a third mode of operation, the display indicates that the subject vehicle is stationary or near stationary in a manner which has less prominence, fewer lamps being illuminated, and in response to detection of a following vehicle being in close proximity to the subject vehicle.

2 Claims, 17 Drawing Sheets

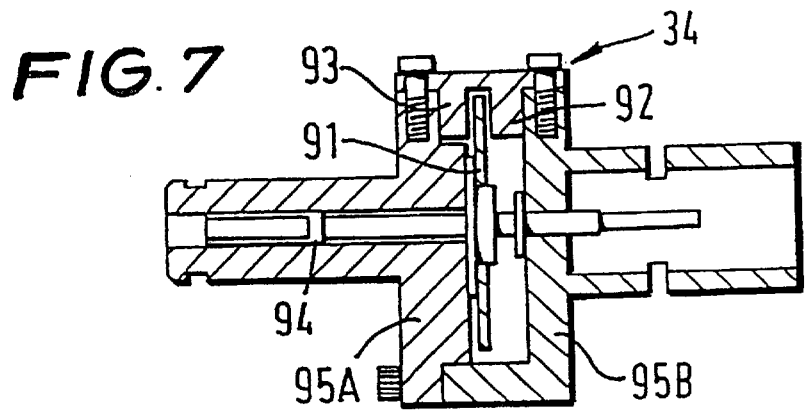
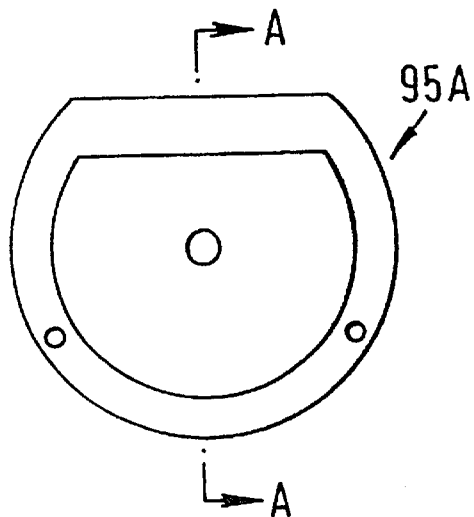
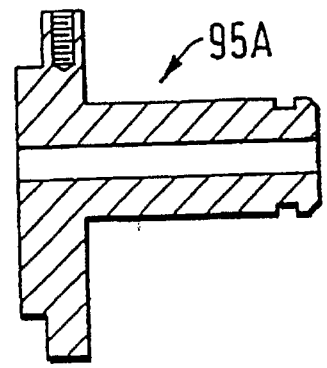
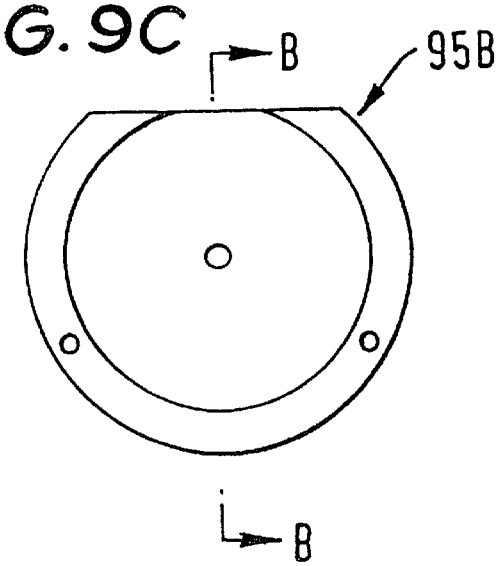
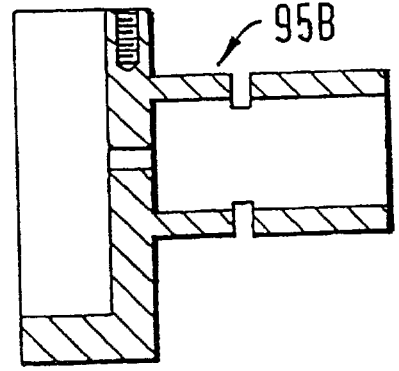

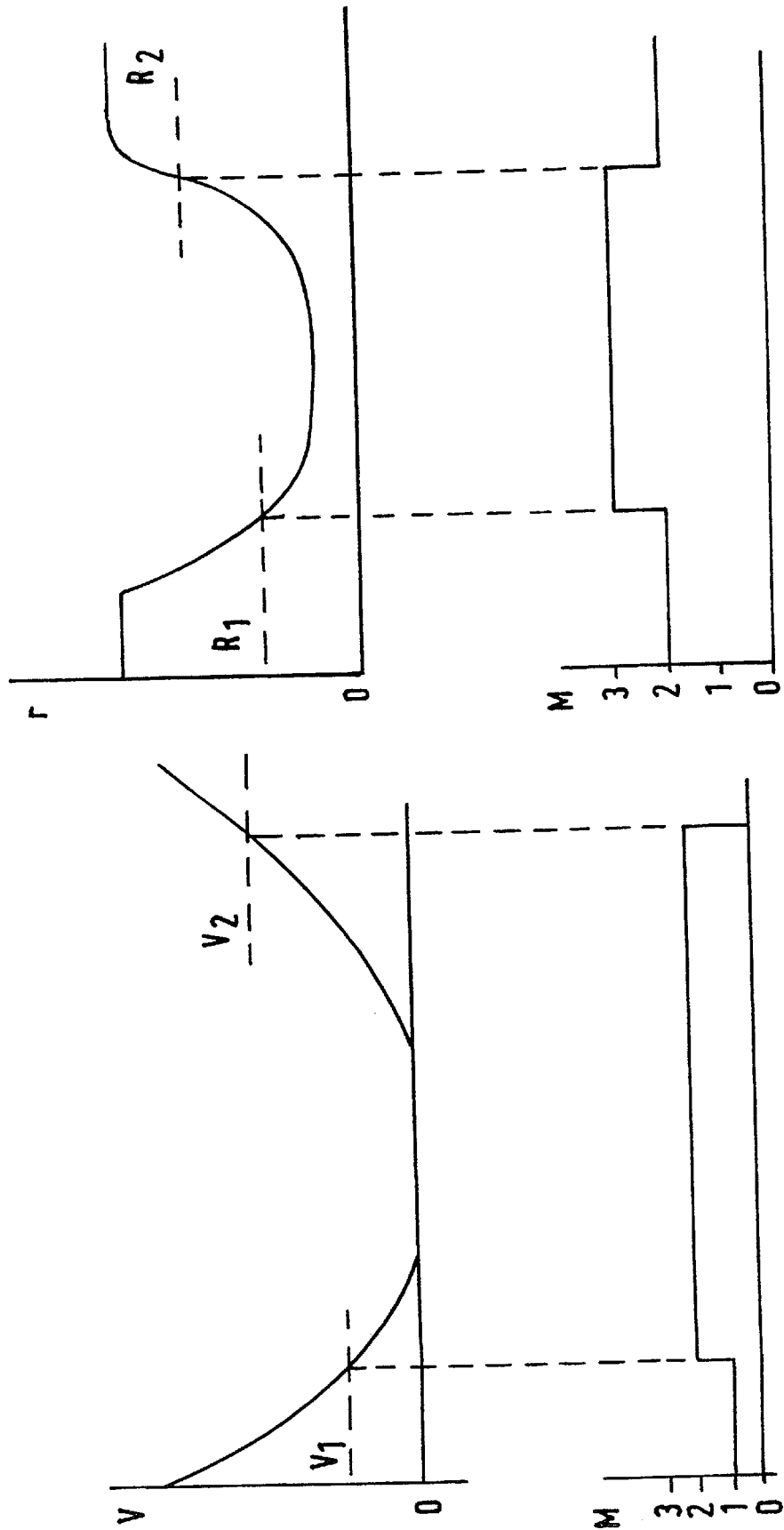

MOTOR VEHICLE SYSTEM AND RANGING DEVICE

CROSS-REFERENCE TO RELATED APPLICATION

This is a continuing prosecution application of my application filed Nov. 22, 1996, Ser. No. 08/754,415, now U.S. Pat. No. 5,838,257 which was a continuation-in-part of Ser. No. 08/289,542 filed on Aug. 5, 1994 now U.S. Pat. No. 5,828,319, issued Oct. 27, 1998, the disclosures for which is incorporated herein by reference.

BACKGROUND OF THE INVENTION

The present invention is directed towards a safety display (lamp) warning system for use with vehicles, which safety display system provides information pertaining to braking events and the state of motion of a vehicle to a driver of a vehicle traveling behind.

Known vehicle display systems include a system which indicates the severity of vehicle braking. One such system is disclosed in Road Research Laboratory Report LR287 issued by the UK Ministry of Transport. Report LR287 discloses a system comprising a multiple brakelight visual display. The number of brake indicator lights which are illuminated in a display is dependent upon he magnitude of deceleration of the vehicle.

BRIEF SUMMARY OF THE INVENTION

It is an object of the present invention to provide a system in which deceleration of the subject vehicle is indicated using a level of warning which is appropriate to the amount of deceleration and which also takes into account the velocity of the subject vehicle. It is a further object of the present invention to provide a system which avoids excessive fluctuation between indicated levels of warning during an extended period of acceleration in which the actual measured level of deceleration fluctuates by an insignificant amount.

It is a further object of the present invention to provide a system in which the levels of warning are indicated using an array of lamps in a manner which is intuitively understandable at first sight by the driver of the following vehicle, irrespective of whether the driver has prior knowledge of the system.

It is a further object of the present invention to provide a system which indicates the state of motion of the subject vehicle as being stationary when the subject vehicle is moving with a velocity which is sufficiently close to zero for the subject vehicle to be effectively regarded as stationary in a typical traffic situation.

It is a further object of the present invention to provide a system which is capable of maintaining an indication of the state of motion being stationary during periods where the velocity of the subject vehicle corresponds to slow moving traffic.

It is a further object of the present invention to provide a system in which the stationary indication is turned off at a higher velocity threshold than the velocity threshold used to turn on the stationary indication when stopping.

It is a further object of the present invention to provide a system in which the proximity of the following vehicle is sensed and the indication of the subject vehicle being stationary is modified to have less prominence when the following vehicle is in close proximity, thereby avoiding excessive annoyance to the driver of the following vehicle.

According to the present invention there is disclosed a vehicle display system for indicating the state of motion of a subject vehicle to a driver of a following vehicle; the system comprising;

deceleration determining means operable to determine whether the station of motion of the subject vehicle is one of deceleration and to determine a measure of deceleration of the subject vehicle;

vehicle motion measuring means operable to sense a measure of velocity of the subject vehicle;

a processor operable to compare the measure of deceleration with a first set of deceleration thresholds defining a first set of distinct ranges of deceleration and to select a level of warning from a corresponding set of levels of warning according to the range of deceleration in which the measure of deceleration is determined to lie;

indicating means comprising an array of lamps controlled by the processor and operable to provide an indication of the state of motion as being one of deceleration by illuminating selected lamps of the array of lamps to provide a pattern of illumination representative of the selected level of warning such that the number of lamps illuminated is proportionate to the level of warning;

and wherein the processor is operable to determine the values of the first set of deceleration thresholds in dependence on the measure of velocity.

The deceleration determining means may be constituted by the processor which may also determine the measure of deceleration from the rate of change of the measure of velocity. Each of the first set of deceleration thresholds may be calculated by the processor to be proportional to the measure of velocity, thereby ensuring that when the vehicle is moving at high speed a relatively small deceleration produces a prominent level of warning and conversely, when the vehicle is moving at slow speed, a relatively high deceleration produces a low level of warning. The system thereby automatically compensates for the vehicle velocity, taking account of the need for fast reaction time at high velocity.

A second set of deceleration thresholds may be utilised during periods when the measure of deceleration is decreasing so that the system has an in built tendency to retain an existing level of warning when the measure of deceleration undergoes slight fluctuation. Additionally, or alternatively, the processor may impose a minimum response time before the level of warning is allowed to decrease.

Preferably the processor discontinues the indication of deceleration when the vehicle velocity is determined to have fallen below a first velocity threshold, the processor then initiating a first indication of the state of motion as being stationary, preferably in the form of an animated display in which lamps are sequentially deactuated to provide a moving pattern of high prominence so as to immediately attract the attention of the driver of the following vehicle.

Preferably the processor is also able to discontinue the first indication of the state of motion as being stationary when the vehicle velocity increases again to above a second velocity threshold which may preferably be greater than the first velocity threshold. This is important during slow traffic situations since it allows the subject vehicle to continue to indicate a warning that it is stationary or slow moving, even when making low speed manoeuvres such as progressively moving forward in a traffic queue.

Preferably the system also includes a proximity sensing means operable to determine when a following vehicle is within a first threshold distance of the subject vehicle, the processor then being operable to modify the first indication of the state of motion being stationary to a less prominent second indication such as a static display consisting of a single pair of lamps continuously illuminated.

According to a further aspect of the present invention there is disclosed a vehicle display system for indicating the state of motion of a subject vehicle to a driver of a following vehicle; the system comprising;

vehicle motion measuring means operable to sense a measure of velocity of the subject vehicle;

a processor operable to compare the measure of velocity with a first velocity threshold and to determine the state of motion of the subject vehicle as being stationary when the measure of velocity has decreased to a value less than the first velocity threshold; and indicating means comprising an array of lamps controlled by the processor and operable to illuminate selected lamps of the array of lamps to provide a pattern of illumination representative of a first indication of the state of motion as being stationary.

According to a further aspect of the present invention there is disclosed a vehicle display system for indicating the state of motion of a subject vehicle to a driver of a following vehicle; the system comprising;

vehicle motion measuring means operable to sense a measure of velocity of the subject vehicle;

a processor operable to determine the state of motion of the vehicle from the measure of velocity;

indicating means comprising an array of lamps controlled by the processor and operable to illuminate selected lamps of the array of lamps to provide a pattern of illumination representative a first indication of the state of motion as being stationary;

a proximity sensing means operable to determine whether a following vehicle is located within a first threshold distance of the subject vehicle;

and wherein the processor is operable when so determined to modify the first indication of the state of motion being stationary to a second indication of the state of motion being stationary which has less prominence to the driver of the following vehicle relative to the first indication.

A BRIEF DESCRIPTION OF THE FIGURES

FIG. 7 shows a sectional side elevation of the speed sensor and opto-switch part of the display system according to the invention;

Figure 3:
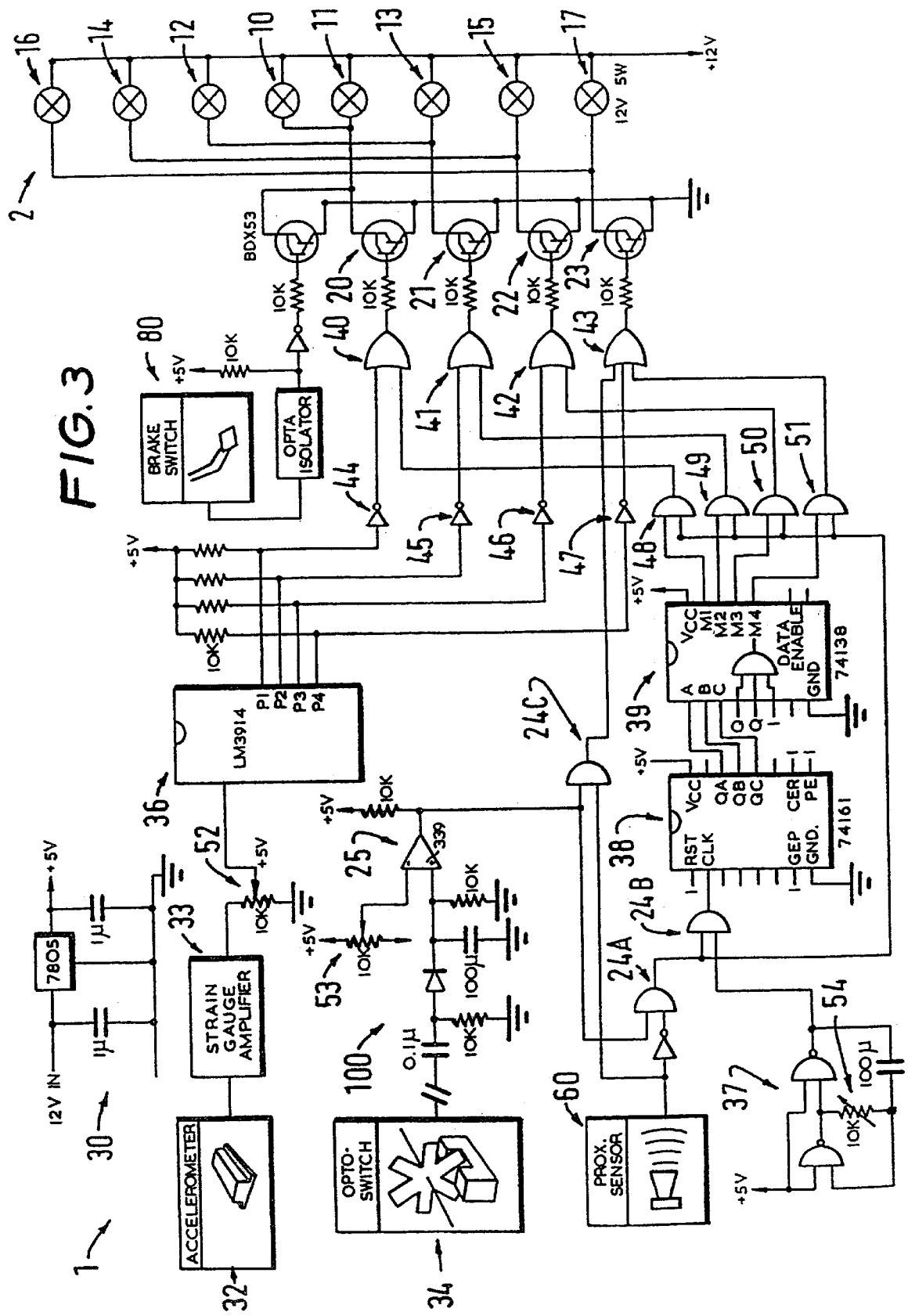
FIG. 3 is a schematic electronic circuit diagram of a display system according to the invention which generates the display sequences shown in FIGS. 1 to 2.
Figure 4:
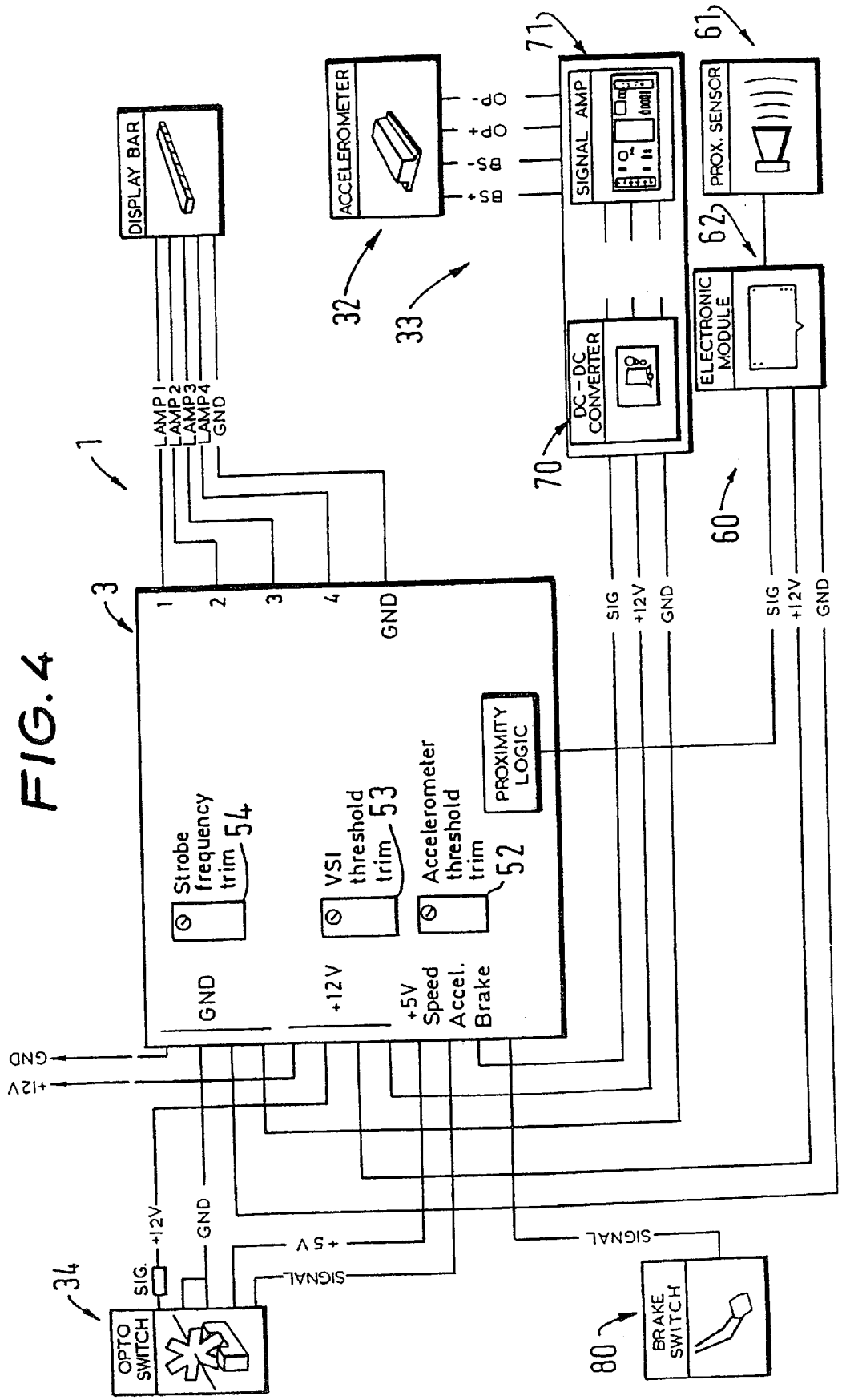
FIG. 4 is a schematic block diagram showing further wiring detail of the system shown in FIG. 3.
Figure 8:
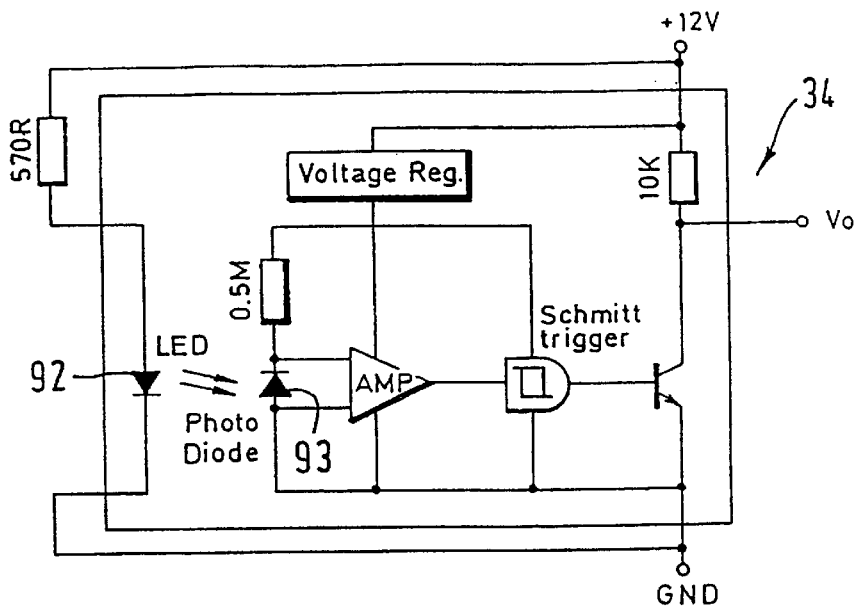
Figure 12:
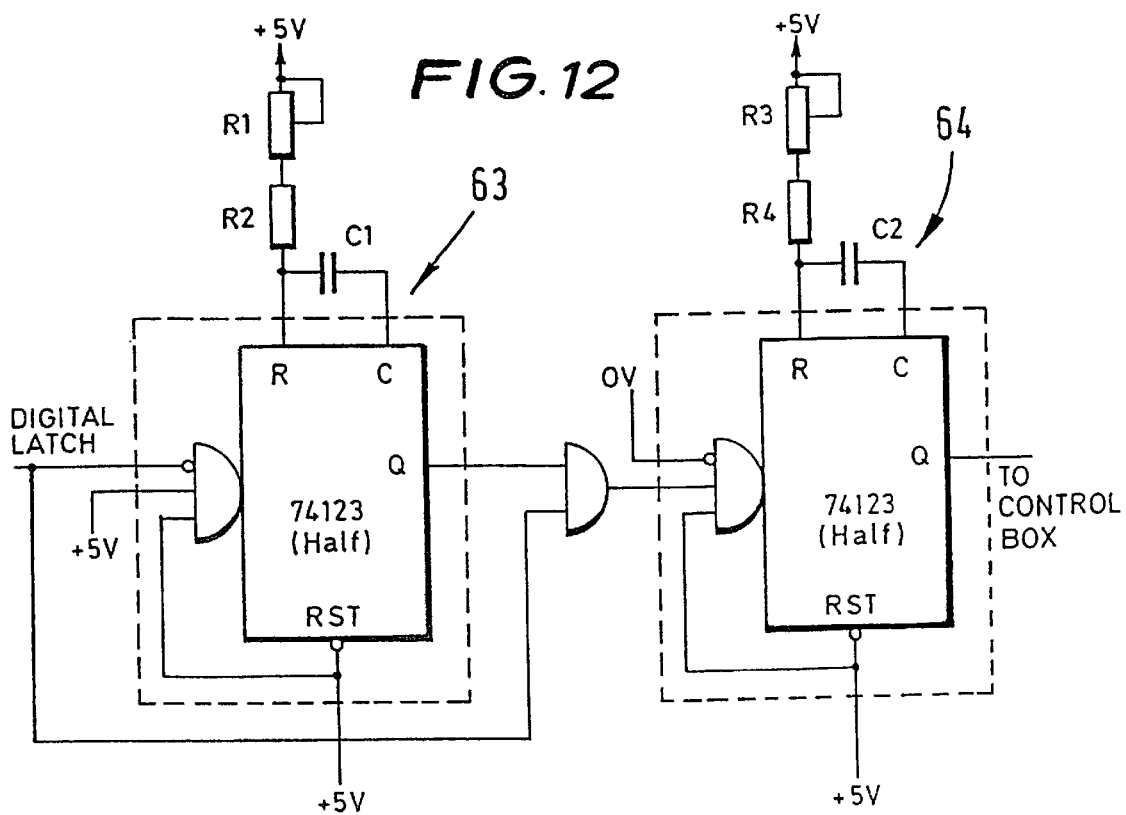
Figure 10:
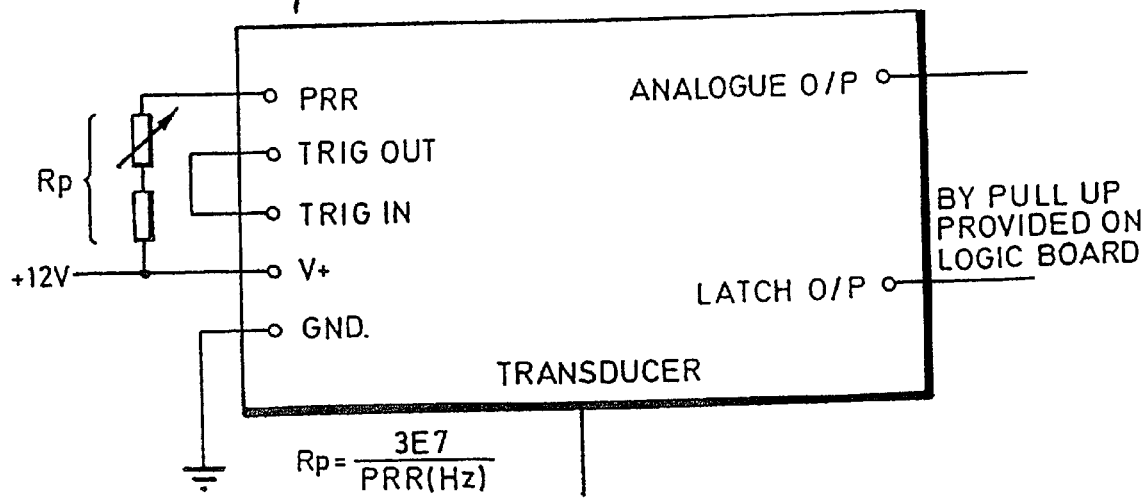
Figure 11:
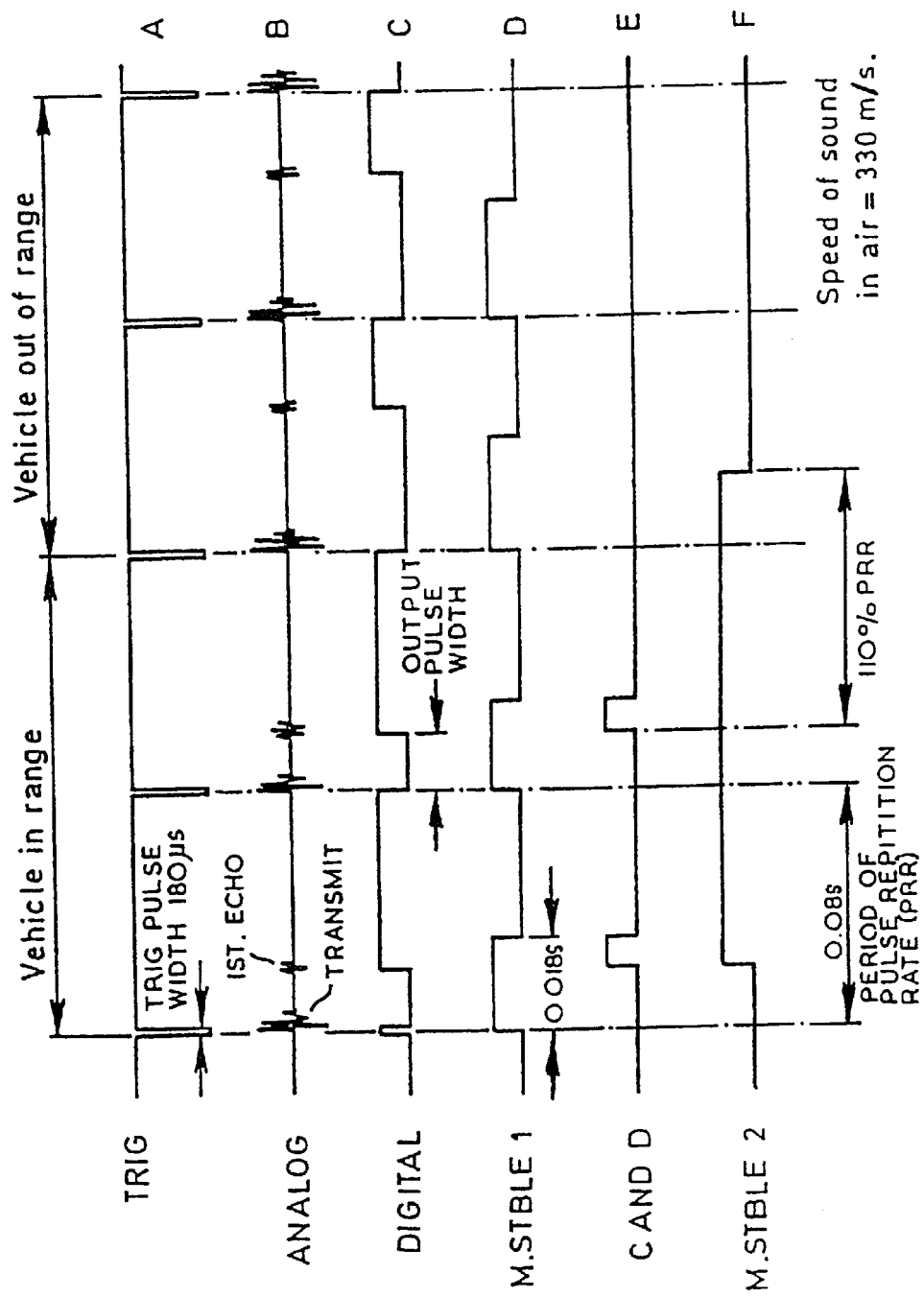
Figure 13:
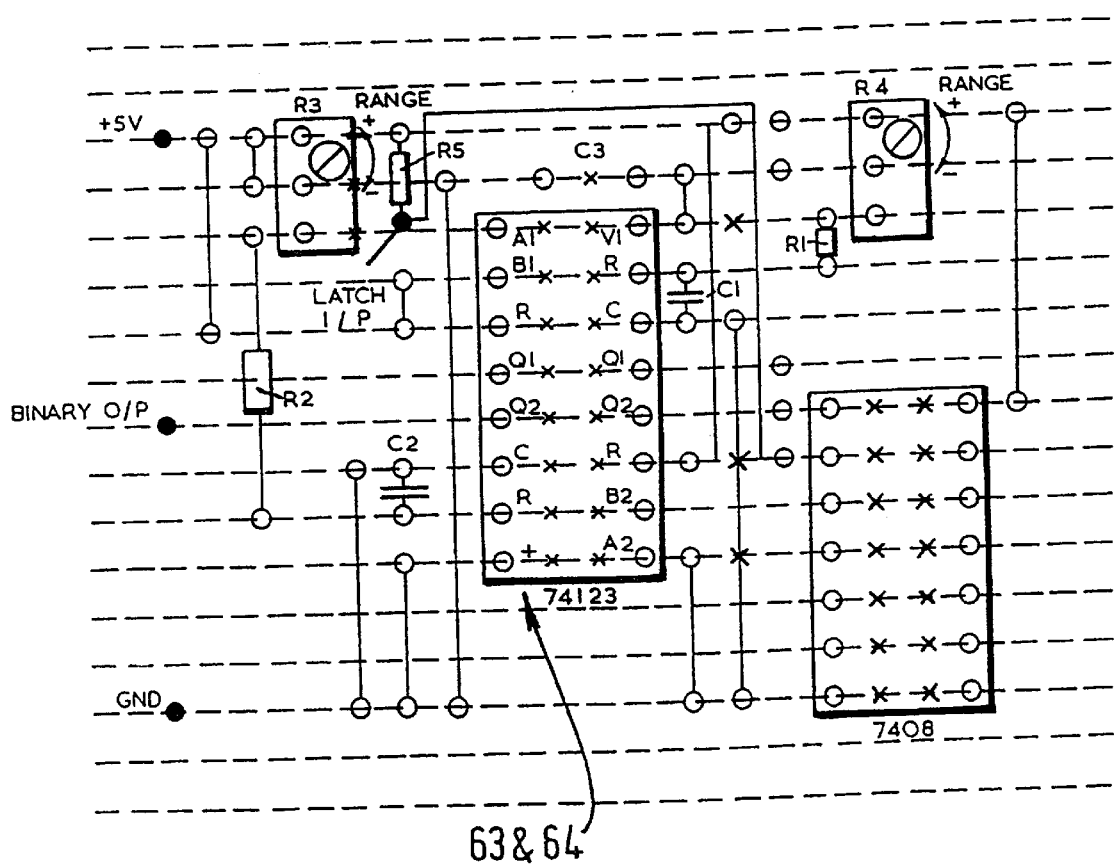
Figure 14:
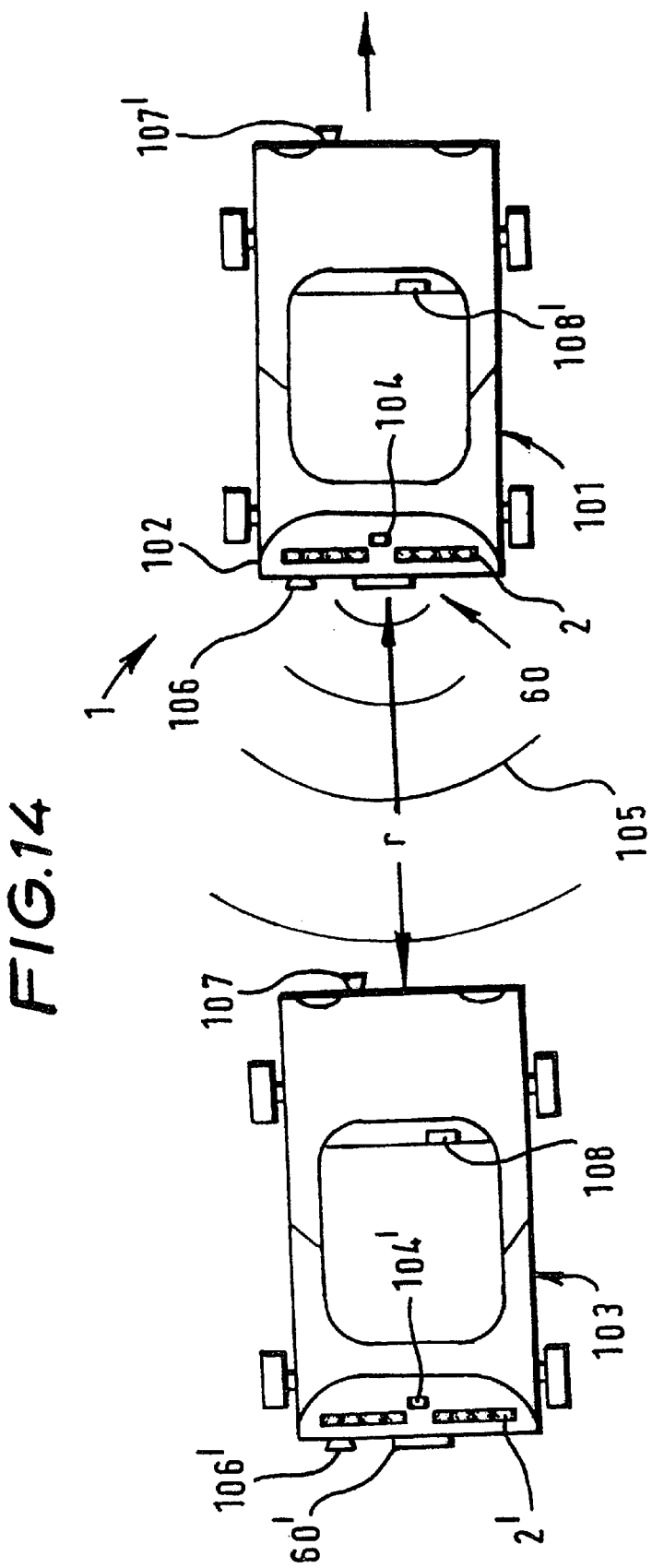
Figure 15:
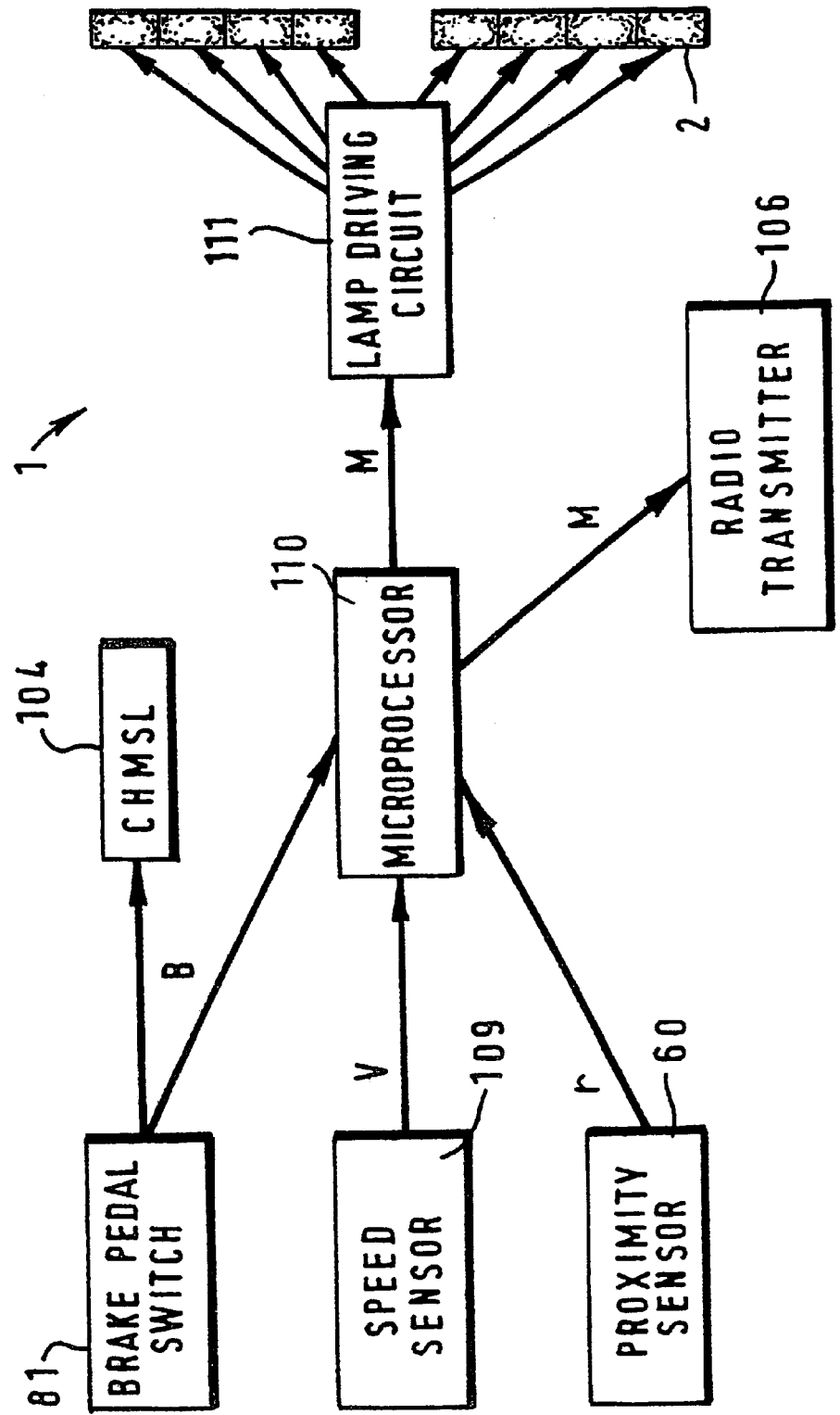
Figure 16:
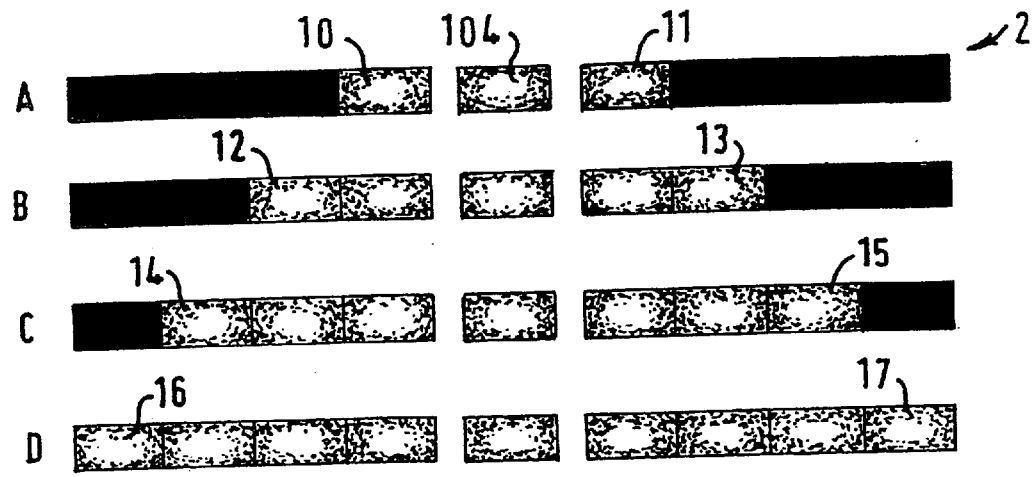
Figure 23:
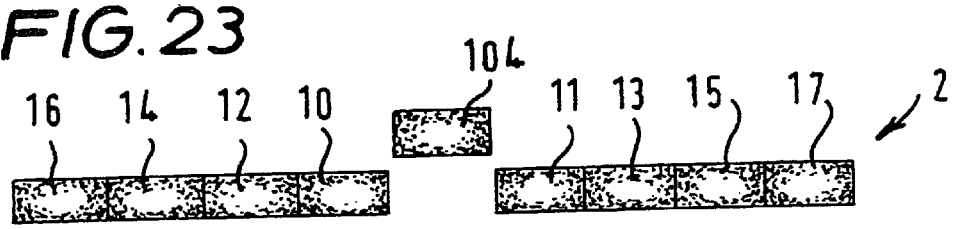
Figure 24:
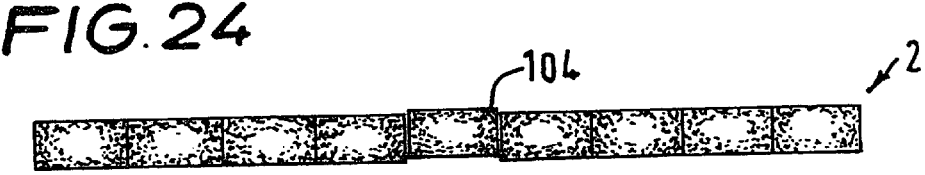
Figure 25:
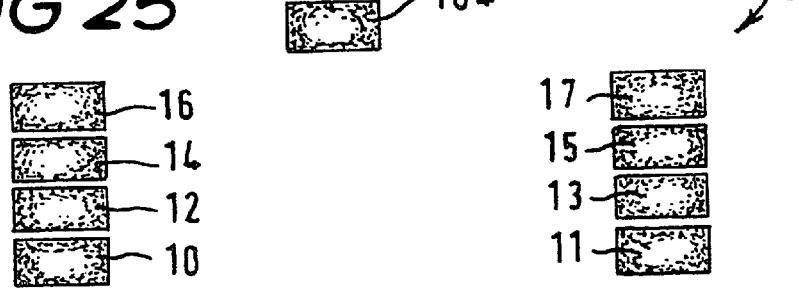
Figure 17:
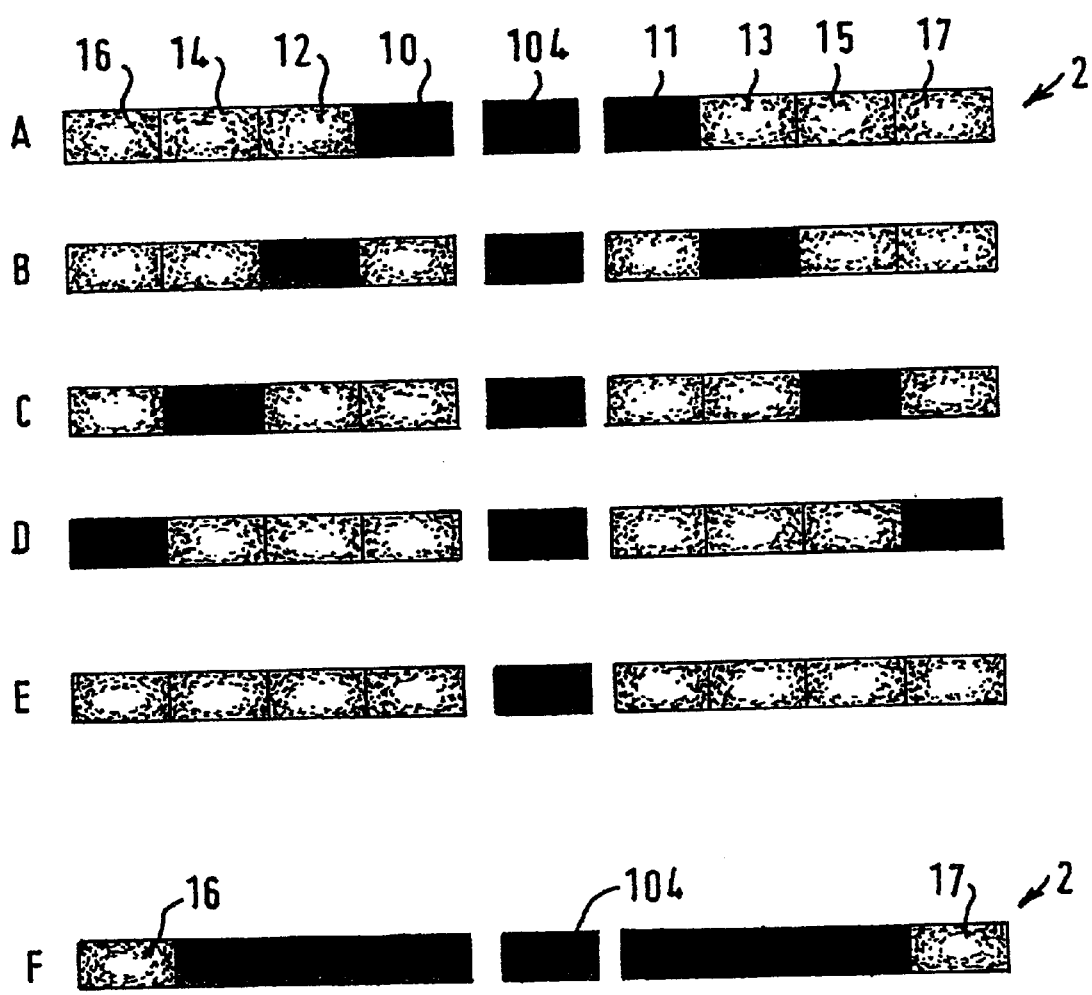
Figure 18:
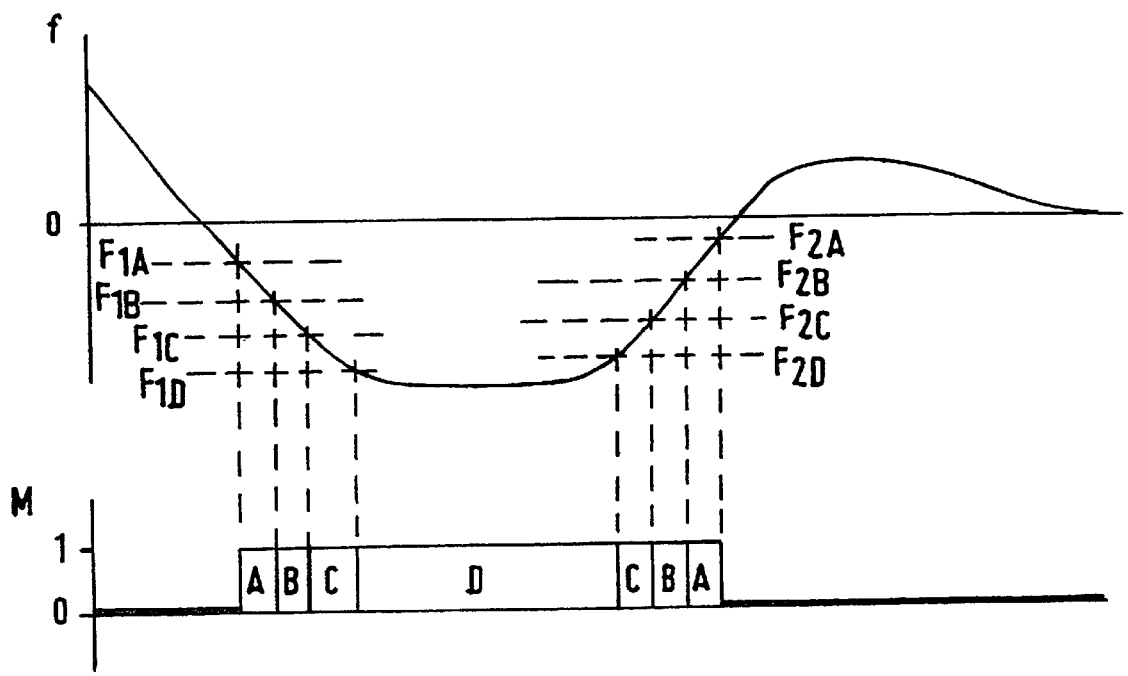
Figure 19:
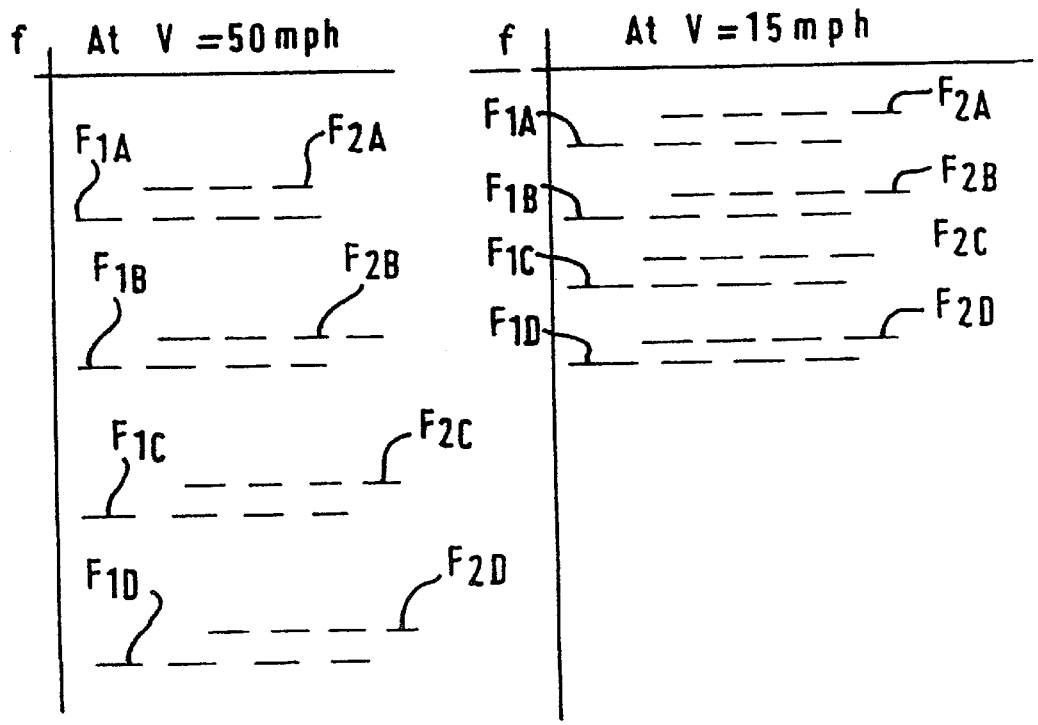
Figure 22:
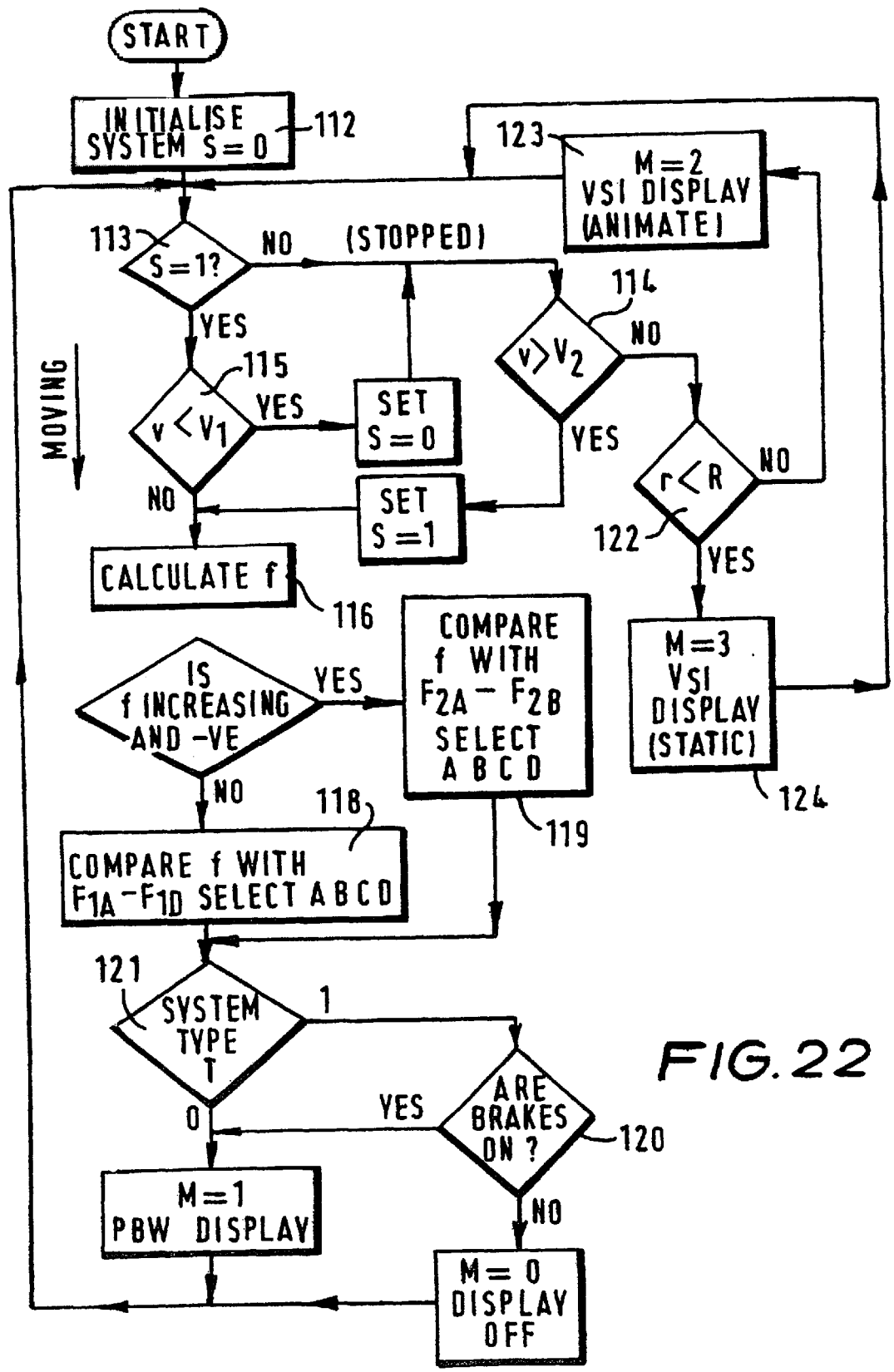
Figure 26:
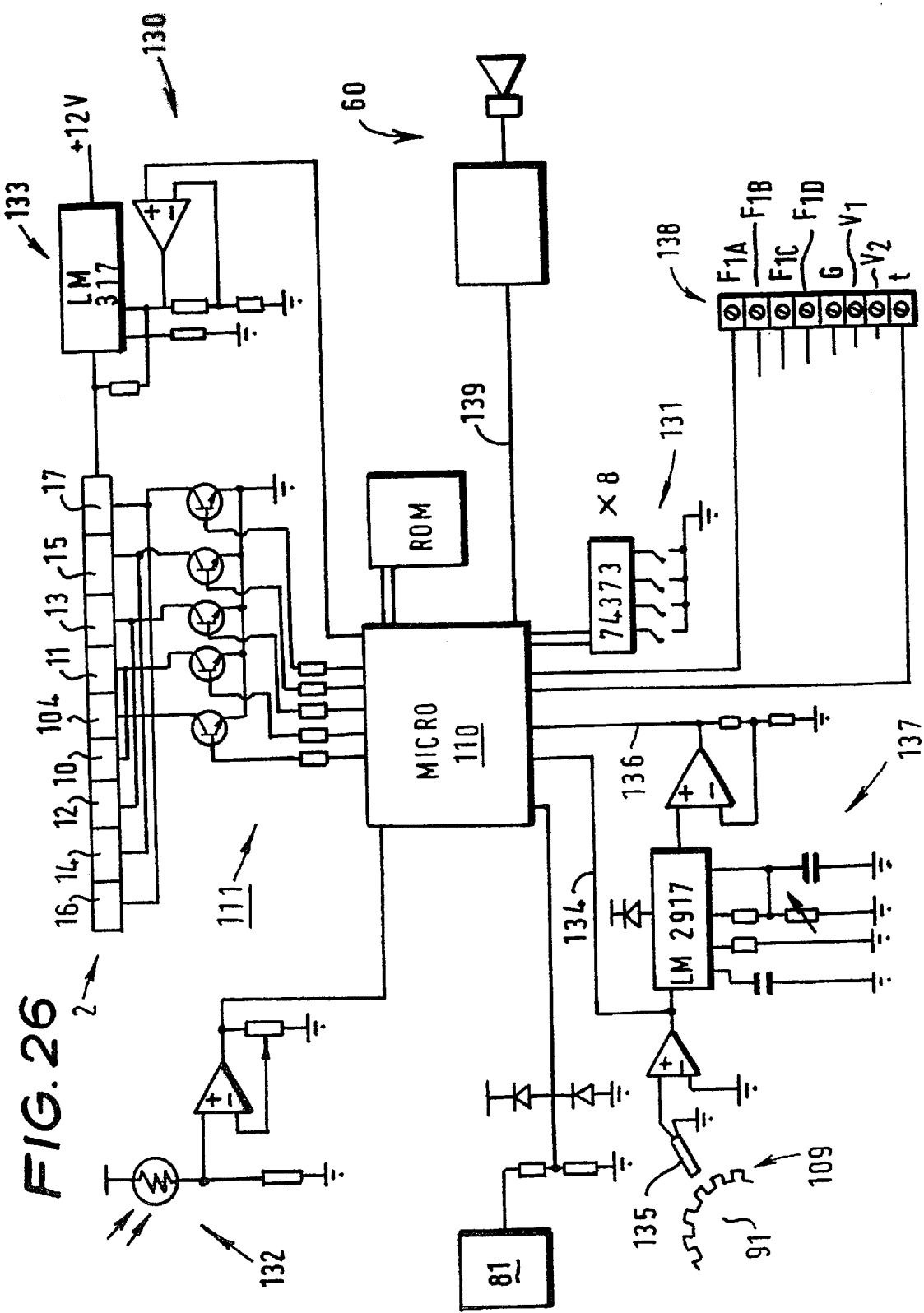

FIG. 8 gives electrical details of the opto-switch shown in FIG. 7 and connected to the circuitry shown in FIGS. 3 and 4;

FIG. 9 parts A to H show various elevation drawings of mechanical components of the opto-switch shown in FIG. 7;

FIG. 10 shows details of the electrical connectors part of the proximity sensor shown in FIGS. 3 and 4;

FIG. 11 shows a pulse time sequence for various component parts of the proximity sensor shown in FIGS. 3, 4, 11 and 12;

FIG. 12 shows wiring to two monostable devices part of the proximity sensor device shown as part of FIGS. 3 and 4;

FIG. 13 shows the wiring of the monostable logic board as partly shown in FIG. 12;

FIG. 14 is a schematic plan view of a subject vehicle and following vehicle in accordance with a further embodiment of the present invention;

FIG. 15 is a schematic circuit diagram of the display system of FIG. 14;

FIG. 16 is a schematic representation of a PBW display showing patterns A, B, C and D of a progressive deceleration warning;

FIG. 17 is a schematic diagram showing patterns A to E of an animate VSI display and pattern F of a static VSI display;

FIG. 18 is a graphical representation of acceleration f and acceleration thresholds $F_{1A}$ to $F_{2D}$;

FIG. 19 is a graphical representation of the variation in acceleration thresholds with speed;

FIG. 20 is a graphical representation of an example of speed variation and speed threshold values;

FIG. 21 is a graphical representation of measured vehicle range and range thresholds;

FIG. 22 is a flow chart showing microprocessor operation;

FIG. 23 is a schematic illustration of an alternative configuration of lamps;

FIG. 24 is a schematic illustration of a further alternative configuration of lamps;

FIG. 25 is a schematic illustration of a further alternative lamp configuration; and FIG. 26 is a schematic circuit for a further alternative embodiment of the present invention.

DESCRIPTION OF THE ILLUSTRATED EMBODIMENTS

Figure 1:
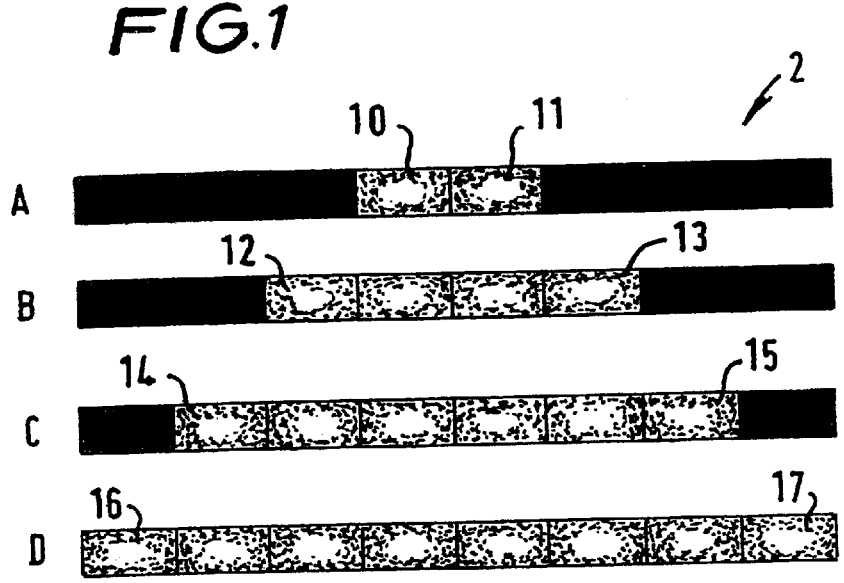
FIG. 1 shows four schematic representations A to D of a display according to the invention.

In a preferred embodiment a motor vehicle display system 1 according to the invention comprises an array 2 of eight lights 10 to 17 which normally would be displayed as red lights in a horizontal array. FIGS. 1A to D show a progressive increase in the number of lights which are illuminated dependent upon the magnitude of deceleration of the vehicle. The lights are represented as 'on' in the drawings by light shading, compared to 'off' which is indicated by a black rectangle. FIG. 1A shows central lights 10 and 11 whilst FIG. 1D shows all eight lights 10 to 17 illuminated.

The display may comprise a different number of lamps, for example, lights 10 and 11 might preferably be replaced by a single unit. The display would then comprise seven lights but it would of course also be possible to have say nine or eleven lights. Whilst rectangular lights are shown here it is also possible to have lights of different shapes. The lights may be of different colours, though red or amber lights are preferred.

The array of lights 2 is carried at the rear of a motor vehicle at the standard high level brake light position in the rear window. The lights face rearwardly and are located so that they are readily visible to an observer, e.g. the driver of a motor vehicle travelling or positioned behind the motor vehicle in which the lighting display is mounted. The lights 10 to 17 are lit in pairs from the centre pair 10 and 11 out to outer pair 16 and 17 during a progressive brake warning (PBW) display. As the vehicle slows, the deceleration is indicated by the number of lights which are lit. Gentle deceleration causes the illumination of lights 10 and 11, whilst slightly harder braking and therefore greater deceleration causes lights 12 and 13 to be illuminated in addition to lights 10 and 11 as shown in FIG. 1B. Firm retardation of the vehicle caused for example by firm depression of a brake pedal is detected by the vehicle display system 1 and causes further lights to be actuated. Thus lights 14 and 15 are illuminated in addition to lights 10 to 13 to indicate relatively large deceleration of the vehicle as shown in FIG. 1C. In order to show a more rapid reduction in vehicle velocity all eight lights are illuminated including outer pair 16 and 17 as shown in FIG. 1D.

Other ways of indicating progressive deceleration might be to vary the relative sizes of pairs of lights, for example, increasing the size of lights 12 and 13 compared to inner pair 10 and 11 and so on, so that outer pair 16 and 17 are the largest. This is found to enhance the apparent 'growth' effect of the display thereby emphasising the more rapid deceleration of the vehicle and its increasing proximity to trailing vehicles. Alternatively, each pair of lights might be a different colour, shade or intensity to other pairs of lights. For example, different tones of amber might be used starting from a light shade for inner pair 10 and 11 and darkening towards outer pair 16 and 17, or possibly outer pair 16 and 17 might be red. A further method would be to change the relative intensity of the pairs of lights so that outer pair 16 and 17 might be brighter than inner pair 10 and 11. A combination of these parameters might be used in a PBW display and also a vehicle stationary indicator to be described.

The lights themselves might comprise electroluminescent bulbs which radiate light through translucent, coloured filters. Alternatively, reflective lights might be used having phosphorescent targets: this can reduce the effect of dazzle of the display. Other forms of light source are envisaged such as light emitting diodes, for example. The display may also comprise a control which enables the intensity of the overall display to be varied, for example, enabling adjustment from a bright day setting to a night setting.

The operation of the light sequence indicative of deceleration is independent of the braking system of the vehicle and dependent principally on the absolute vehicle deceleration, except that it is possible to illuminate lights 10 and 11 when the vehicle brake pedal is depressed independent of the actual deceleration caused. In this way the initial indication from the light display is similar to the known brake light displays such as high mounted single centre brake light presently in use on some motor vehicles. In a preferred form however, the initial deceleration is independent of both the vehicle accelerator or brake controls. This might not always be possible since certain national laws may require that the first lights are illuminated only when the brake pedal is depressed.

An advantage of a display system 1 according to the present invention is that it can be mounted in a vehicle during manufacture, or alternatively, at a later time by making minor modifications to a vehicle, so that a retrofit unit or kit could be made available for the 'after sales' market. This is possible since deceleration can be detected by an accelerometer (described later) which is independent of any existing vehicle components.

The display system is also operable to generate a display indicative of the vehicle having come to rest. This particular arrangement is termed a vehicle stationary indicator (VSI). The display may be animate or static. An animate visual display sequence is shown schematically in FIG. 2A to D, by way of example. In this case, six of the eight lights in array 2 are lit at all times and pairs of lights are deactivated sequentially. Thus in FIG. 2A lights 10 and 11 are deactivated whilst lights 12 to 17 are illuminated, and in FIG. 2B lights 12 and 13 are deactivated whilst the rest of the display is illuminated. FIGS. 2C and D show lights 14 and 15 deactivated and 1 6 and 17 deactivated respectively whilst the rest are lit. This sequence can be operated cyclically whilst the vehicle is stationary, for example, having a repeat period of about 1 second. The dynamic animate effect is useful in catching the attention of drivers in following vehicles. The effect of the animate display is such that it is intended to indicate that the associated vehicle is stationary and not just braking, this fact should be apparent from the display and/or sequence and consequently a number of different sequences could be used.

The animate sequence of the vehicle stationary indicator can be disabled when a following vehicle is less than a certain distance behind the vehicle carrying the display system 1. This has the beneficial effect of avoiding annoyance or mesmerisation of occupants of following vehicles, for example, when in heavy traffic or when stopped at traffic control lights. An indication that the vehicle is stationary can still be effected by maintaining the outer pair of lights 16 and 17 in a continuously lit mode as shown in FIG. 2E. This in itself has a further benefit of avoiding misinterpretation by the driver of a following vehicle that the vehicle ahead is about to accelerate away. Alternatively the intensity of illumination of lights 10 to 17 can be reduced when a following vehicle is a predetermined distance behind. This has the advantage of maintaining the same display whilst the vehicle is stationary, thereby avoiding any confusion of the driver of a following vehicle. The lights 10 to 17 may be dimmed simply by dividing the voltage across the lamps when a proximity sensor, described later, gives a signal indicative of a nearby trailing vehicle. It is apparent that the 'vehicle stationary indicator' display should be terminated when the vehicle starts to move off thus it is appropriate for the display system 1 to comprise a vehicle motion detector (described in detail later) which operates to detect whether the vehicle is moving.

In another embodiment the animate display may change to an even intensity, static display when a trailing vehicle is detected by the proximity sensor. The static display might be a linear array of amber triangular lights for example. In a further form the display only provides a static VSI signal and comprises lights of a preset intensity which is sufficiently low not to dazzle drivers in trailing vehicles. In this latter form a proximity sensor may be omitted thereby reducing the cost of the overall display system. In another form the VSI signal might be generated by the same lights used for the PBW signal where in this latter case the lights are red rectangles, for example and in the former case the lights change to amber triangles for example, when the vehicle stops.

Electronic circuitry used to control the light display is shown in FIGS. 3 and 4. The circuit diagram is schematic but can be seen to generate a logic sequence dependent on various inputs, which actuates the light display shown in FIGS. 1 and 2.

The vehicle display system 1 shown comprises the array 2 of eight lights 10 to 17 which are 12 V 5 W (or 21 W)

lamps for example. The traditional red brake light is generated in the usual way by using a translucent red filter. Pairs of lights 10 and 11, 12 and 13, 14 and 15, and 16 and 17 are connected to power transistors 20, 21, 22 and 23 respectively. Each lamp is connected to a +12 V DC supply and is illuminated when the relevant power transistor is opened to earth. Since the lamps are connected in pairs as shown, only one input is required to the relevant transistor 20 to 23 to illuminate or deactivate each pair of the lamps.

Figure 5:
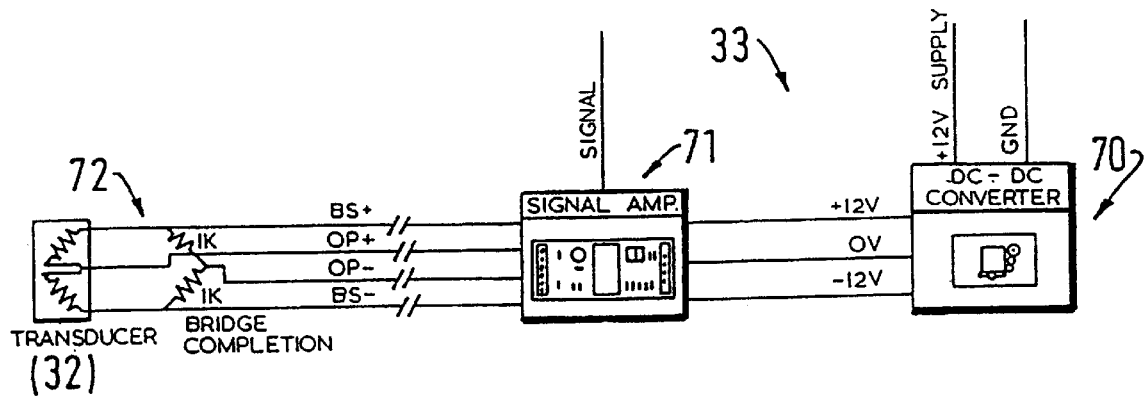
FIG. 5 shows an example of the accelerometer connections as part of the electronic circuit used to control a display system according to the invention.

The combined display effect of progressive brake warning and vehicle stationary indication are generated in this example using the circuitry shown to open and close transistors 20 to 23 between the lamps and earth. The circuit comprises a +12 V DC power supply (not shown) and a regulator circuit 3C which generates a +5 V output. Accelerometer unit 32 and 33 is a piezo-resistive seismic mass type accelerometer arranged in a wheatstone bridge with integral control and temperature compensation as shown in FIG. 5. This provides an output signal proportional to the acceleration (or deceleration) of the vehicle which is fed to variable resistor 52 and which signal is independent of the mechanical braking system operated by the brake pedal and therefore allows for factors such as skid. Accelerator unit 32 and 33 is driven by +12 V output, which is fed to a DC—DC converter 70. The converter 70 can be a miniature encapsulated 750 mW device which provides a + and −12 V supply to signal amplifier 71. The converter 70 is fully reverse polarity protected and each of the input and output rails are decoupled using electrolytic capacitors (not shown). Amplifier 71 comprises a wheatstone bridge 72 (such as that described in Radio Spares data sheet 8155 issued November 1987 for example). The amplifier 71 may be an off the shelf item or modified such that in a specific form the amplifier 71 has a gain of 250 and zero adjust from ±6.7 V output. The gain and zero adjustment are set to values compatible with the accelerometer. The accelerometer 32 may be an Entran EGED-240-10 for example. The strain gauge amplifier 71 is used to raise the signal level from 10 mV g to a level compatible with bar graph driver 36 which might be 2.5 V g in this specific example. This device as a whole has the advantages of giving a steady state (DC) response, miniature size, robustness, low cost and ease of application.

Figure 6:
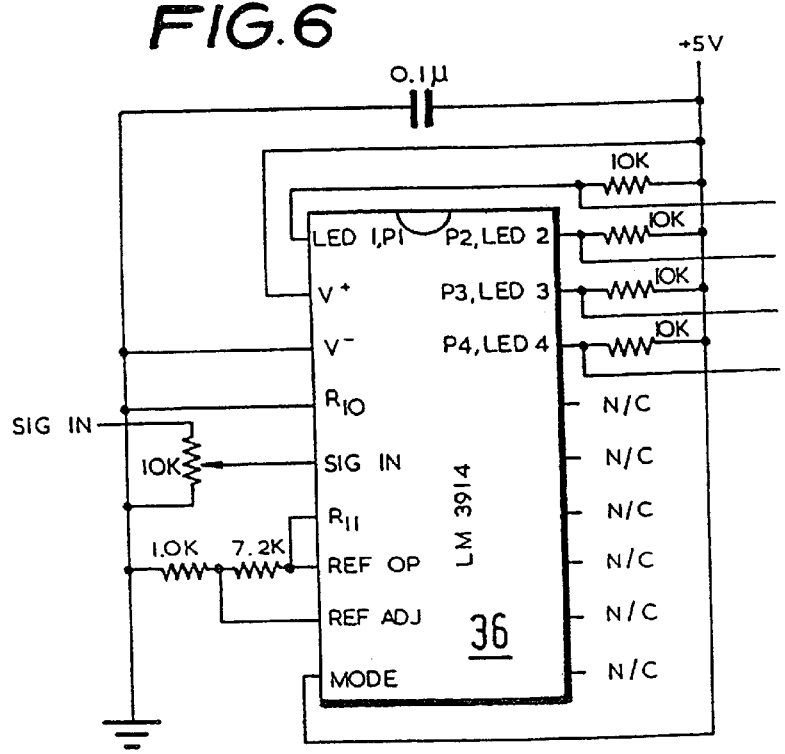
FIG. 6 shows further wiring details of the bar graph driver part of the circuit shown in FIG. 3.

The analogue output from the accelerometer passes through a 10 kOhm variable register to a bar graph driver 36 which is a LM3914 device for example as shown in FIG. 6. Variation of the gain and offset of the output signal from amplifier 33 together with variation of potentiometer 52 can be used to alter the input voltage of driver 36 for any given vehicle deceleration. In this example the driver 36 has a linear output to input signal relationship. Thus the number of lights illuminated by the progressive brake warning system may be selected in four levels representative of vehicle deceleration of 0.05 g to 0.2 g, 0.3 g to 0.4 g, 0.4 g to 0.6 g, and 0.6 g and above for example.

These ranges are given by way of example and can be varied to suit the type of display used. The lowest threshold level which causes the first deceleration light to come on is preferably set to a level such that simply changing gear does not cause the light to come on but preferably should enable a signal to be generated when the driver is deliberately decelerating, albeit gently, by reducing pressure on the accelerator pedal for example. Also, the incrementation of the levels need not be even, as is approximately the case in the above example, and might vary nonlinearly such as exponentially.

Power transistors 20 and 23 are caused to turn lamps 10 to 17 on by generating a high output from the relevant OR gates 40 to 43. The input to transistor 20, which controls central lamps 10 and 11, is connected to OR gate 40. The default input to OR gate 40 is low since the +5 V supply passes through a resistor and invertor 44.

The output from invertor 44 is high when driver 36 enables pin P1 to take the input to invertor 44 low. Similarly driver 36 causes a high output from invertors 45, 46 and 47 by enabling pins P2, P3 and P4 respectively. Thus, in the case of gentle deceleration detected by the accelerometer 32, driver 36 causes only P1 to generate a low input at invertor 44. A high input signal at OR gate 40 causes a high input at the input base of transistor 20 which thereby illuminates lights 10 and 11.

FIGS. 3 and 4 also show how, using device 80, a brake pedal signal can be used to illuminate central pair of lights 10 and 11 whenever the brake pedal is depressed. This might be used to indicate very slight deceleration below the preset threshold of the progressive brake warning system.

The vehicle stationary indication display described with reference to FIG. 2 can be effected using opto-switch 34 and circuitry shown in FIGS. 3, 4 and 8 which make up a vehicle motion detector which measures the vehicles velocity, although for the vehicle stationary indication display it is only essential to know whether the vehicle is stationary or moving.

The information that the vehicle is stationary can be obtained using a slotted opto-sensor 34 attached to the rear of a vehicle speedometer (not shown). The speedometer drive cable spins a slotted disk 91 housed in a nylon casing 95. The slotted disk 91 is attached to a spindle 94 which is placed serially between the speedometer and cable. The opto-switch 34 comprises LED 92 and photo-diode 93. As the spindle turns, infra-red light from LED92 is alternately obscured then allowed to fall on photo-diode 93. Integrated circuitry filters the output from photo-diode 93 to produce a clean TTL (Transistor/Transistor Logic) compatible square wave, the frequency of which is proportional to vehicle speed.

The signal output from opto-switch 34 is applied to the RC (resistor/capacitor) network 100 shown in FIG. 3. When the signal is high (+12 V) the small 0.1 microfarad capacitor quickly charges through the first 10 kilo-Ohm resistor. As the signal voltage the falls back to zero the current stored in the small capacitor discharges through the route of least resistance, in this case through the diode and into the relatively large 100 microF capacitator. Without a potential applied across the capacitor however the charge leaks away through the 10 kilo-Ohm resistor as it cannot pass back through the diode. Provided that the frequency of the square wave is low enough the charge in the 100 microF capacitator leaks away almost completely before being charged once more. The voltage seen by the positive terminal on the comparator 25 (such as the 339 device for example) will be virtually zero with small peaks of around 12 MV as each packet of charge is pumped through. As the frequency increases the small capacitor, pumps more small amounts of charge into the large capacitor, raising the potential across it and thus the voltage at the terminal of the comparator 25. This time the frequency is such that the charge has not enough time to leak completely away through the second resistor so that the charge in the large capacitor increases with each amount of charge delivered to it. After a number of cycles the system will reach an equilibrium and a steady voltage will be present at the positive terminal of the comparator, the voltage increasing in some proportion with the vehicle speed.

The comparator 25 has a reference voltage adjusted by the voltage divider 53 applied to its negative input. When the positive terminal is below the reference voltage the output of the comparator 25 is kept high by the 5 V pull up. Above the reference voltage the comparator 25 pulls its output to ground. The components in the RC network 100 and the voltage reference are adjusted so that the transition occurs at very low vehicle speed close to stationary. Thus a binary signal is available to the control system indicating 'vehicle stationary' (logic 1) or 'vehicle not stationary' (logic 0).

Figure 9E:
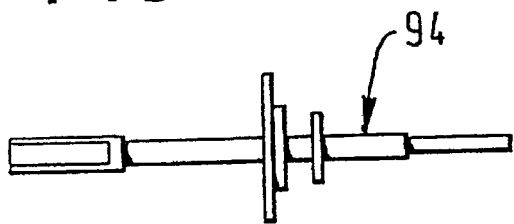
Figure 9F:
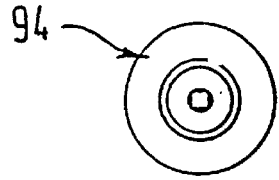
Figure 9G:
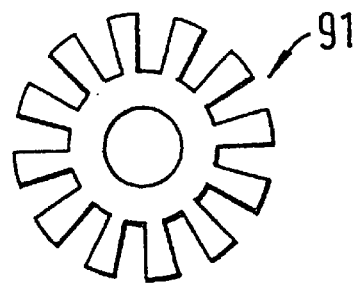
Figure 9H:
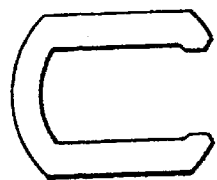

The mechanical components of the opto-switch device are shown in FIGS. 9A to H. Where FIG. 9A shows an end elevation from the cable side and FIG. 9B is a sectional side elevation along axis A—A of housing part 95A. FIG. 9C shows an end elevation from the speedometer end and FIG. 9D is a sectional side elevation on axis B—B of housing part 95B. FIG. 9E shows a side elevation of spindle 94 whilst FIG. 9F is an end elevation thereof. FIG. 9G is an end elevation of slotted disk 91 and FIG. 9H a view of a clip used to complete the assembly.

The opto-switch device is given by way of example only and it is envisaged that the vehicle stationary indication display may be enabled using input data for any form of stationary detection such as from an electronic speedometer or from an anti-lock braking system (ABS). With regard to the latter it is possible to modify the present, commonly used ABS components to provide the information required by the display system in both its PBW and VSI roles. Anti-lock braking systems typically comprise a device connected to a wheel hub which device rotates with the wheel to provide an electronic signal proportional to the rate of revolution of the wheel, for example by using an electromagnetic inductive technique. For ABS purposes it is only required to know if the wheel locks. However, for the purposes of the present display system, greater information about the vehicle's speed is required in order for deceleration to be calculated. Therefore, modification of the ABS inductive device can be carried out to provide appropriate information, discussed later, in the device output signal.

In the VSI system described here, a square wave generator 37 triggers a counter 38 which is a 74161 device for example. Using AND gates 24a and 24b, only when the outputs from comparator 25 and oscillator 37 are high and proximity sensor 60 (described later) is low, is the clock input to counter 38 high. Whilst the vehicle is stationary the count rate is determined by oscillator 37 which can be configured to generate a specific time interval between the change of display signals shown in FIGS. 2A to D.

Counter 38 generates a binary output from 0 to 4 which is fed to demultiplexor 39, which is a 74138 device for example. The demultiplexor generates high and low outputs at pins M1, M2, M3 and M4 dependent on the input signal from counter 38. Pin M1, M2, M3 and M4 are connected to one input terminal of AND gates 48, 49, 59 and 51 respectively. The other input to AND gates 48 to 51 is taken from the output of comparator 25 and proximity sensor 60 at gate 24a which is thus the output signal which enables the animate vehicle stationary indication display.

Outputs from AND gates 48 to 51 are connected to an input of OR gates 40 to 43 previously described in respect of the progressive brake warning displays. When the vehicle is stopped the input to OR gates 40 to 43 from invertors 44 to 47 will be low since there is no change in speed to generate a signal output from accelerometer 32. Thus when any of the inputs to OR gates 40 to 43 from AND gates 48 to 51 go high the relevant pair of lamps will be illuminated.

Figure 2:
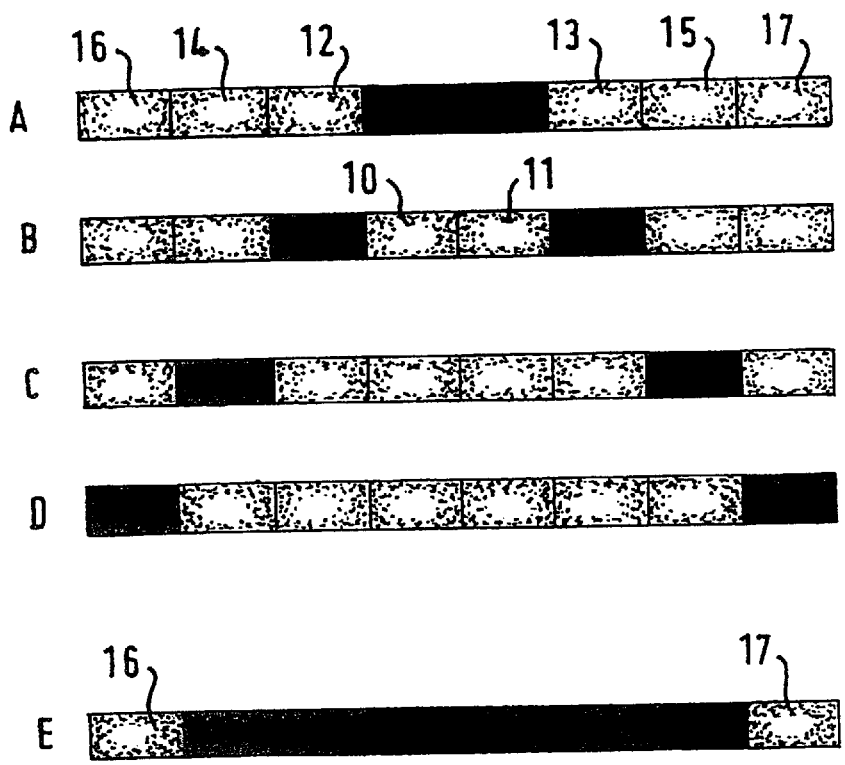
FIG. 2 shows five schematic representations A to E of the display shown in FIG. 1 used to indicate that a vehicle is stationary.

The animated cyclic display described with reference to FIG. 2 is effected by the timing of oscillator 37 and the switching sequence generated by multiplexor 39. The display sequence can easily be varied by altering these components or, indeed, configuring the electrical circuit differently, for example by wiring individual lamps and not pairs of lamps.

The termination of the animate vehicle stationary display can be achieved in various ways such as by using proximity sensor 60 shown in FIGS. 3, 4, 10, 11 and 12 for example. A variety of devices could be used such as infra-red, optical, microwave or radar systems, however an ultrasonic device is described here since, inter alia, it is found easy to weather-proof and has small dimensions and low cost. The ultrasonic transducer 61 can be a small (for example 25 mm) 26 kHz transducer with a maximum range of 9 m when used with a small directional horn, for example. The proximity sensor 60 includes a remote ranging module 62 which drives the transducer 61 and filters the output from it. Module 62 provides a digital latch output labelled C in FIG. 11. As the transducer is triggered the latch is switched low. It stays low until the first echo is received whereby it switches high. It remains high until triggered low again by the start of the next trigger pulse (A in FIG. 11). If the object is out of range of the sensor 60 (greater than 9 m in this example) then the latch is not switched high by the returning echo. In which case the trigger switches the latch high momentarily then back low, the pulse width being similar to that of the trigger at approximately 180 microseconds say, as shown in FIG. 11. The duration of the low pulse from the latch provides a means to calculate the distance of an object, in this case a trailing vehicle.

The digital latch signal is used to set a monostable device 63, such as a 74123 dual resettable for example, running high. The latch output is tied to +5 V as a logic high state and when it is switched hard on by the module 62 the latch output is pulled to ground, logic low; otherwise the output is logic high. Thus the latch output it compatible with 5 V TTL logic in the control box 3. The total output is applied to the 'A' input of first monostable 63 as shown in FIG. 12. Each time the transducer is triggered the falling edge of the latch sets the monostable high as shown in trace D of FIG. 11. The monostable timing circuit is calibrated such that it resets the monostable 63 after a period of 0.018 s which corresponds to a range of approximately 3 m from the transducer. That is a total of 6 m travelled by sound at 330 m/s. The period of the pulse repetition rate PRR is set at 0.06 s (i.e. greater than the time equivalent of the length of sound travel path) in this example. Monostable 63 may be a DM74LS123 device for example where delay Tw=0.37 Cx Rx such that for C1=10 microfarads and R1=10 kilo-Ohm variable and R2=2.2 kilo-Ohm as shown in FIG. 12, Tw=0.008 to 0.0452 s giving a range of 1.34 to 7.45 meters. Selection of delay Tw=0.018 s is therefore only given as an example for vehicle detection up to approximately 3 meters from transducer 61.

The digital latch output from module 62 and the output from monostable 63 are coupled using a logic AND gate. The output of this gate thus gives a logic high state if a car is detected with the specified range, three meters in this example, as shown in trace E of FIG. 11. This pulse signal is fed to the 'B' input of a second monostable device 64, again a 74123 device for example. The delay period of device 64 is set to correspond to approximately 110% of the period of PRR.

Thus, as long as a car is within range (3 m in this example) the output of the second monostable 64 remains high. If the following vehicle moves out of range then monostable 64 is not reactivated and falls back low after 0.066 s (110% PRR period) and remains low until a vehicle is again detected in range. Thus, a binary signal is output from proximity sensor 60 indicating vehicles less than 3 m behind (logic high) or, vehicle or vehicles greater than 3 m behind (logic low). This is shown as trace F in FIG. 11.

The output from proximity sensor 60 is inverted and fed to AND gate 24a which also has as input the output from comparator 25. If the vehicle is stopped and there is no vehicle within the range of sensor 60 then both inputs to gate 24a will be high and the animate display is enabled as previously described.

The output from proximity sensor 60 is also fed to AND gate 24C to which is also applied the output from comparator 25. If the vehicle is stationary and there is a vehicle within the set range then both inputs to AND gate 24C will be high and outer pair of lights 16 and 17 will be illuminated until such time as the vehicle behind moves out of range, or as is apparently more likely, the vehicle with the display system 1 starts to move in which case the vehicle stationary indicator is deactivated entirely It is also envisaged that whilst an accelerometer 32 and opto-switch 34 are used in this example it is possible to make use of a vehicle's anti-lock brake system (ABS) and the wheel speed sensors therein in a display system according to the invention. It is possible to continuously measure the speed of a vehicle from this source (or indeed any independent vehicle velocity measuring device) and thereby calculate acceleration using a time reference. It would then be possible to use this source to drive the logic circuit just described to illuminate and deactivate lamps 10 to 17 in accordance with the sequence described with respect to FIGS. 1 and 2. This technique has the benefit that it substantially uses a system already fitted to generate relevant vehicle data independent of the actual braking system itself. It may therefore be readily incorporated during manufacture and has the advantage of reducing the cost of the display system itself. However, as previously described some modification of currently available ABS devices may be required in order specifically to enhance the signal generated using such a device. In particular it may be necessary to increase the sampling rate of the ABS device in order to provide a signal of sufficient variability to enable preset ranges of deceleration/acceleration to be distinguished. In a preferred form the present display system would derive input data from ABS devices attached to diagonally opposite wheels on a vehicle. Additionally, the ABS device and a time reference system as just described could be used to provide a signal to a display which is indicative of the vehicle travelling at constant speed or accelerating. The display for the latter might comprise an array of green lights for example the number of which that are activated depending on the magnitude of acceleration.

It is also envisaged that a display indicator for presenting a PBW or VSI signal to a driver may be fitted in vehicles to be visible to the driver of that vehicle, where the display indicator I responsive to a vehicle motion detection means or a vehicle deceleration detection means in another vehicle. Thus a display indicator in a trailing vehicle might receive a radio signal from a leading vehicle which radio signal contains information about the state of motion of the leading vehicle.

The display indicator would therefore comprise a radio receiver and means either to distinguish the signal from the immediately leading vehicle when presented with several signals from several leading vehicles or to terminate the display in order not to present erroneous information to a driver in such circumstances of several signals being received by the radio receiver.

A further embodiment of the present invention will now be described using corresponding reference numbers to those of preceding Figures where appropriate for corresponding elements.

FIG. 14 shows schematically a subject vehicle 101 to which a display system 1 in accordance with the present invention has been fitted. The display system 1 comprises an array 2 of red lamps mounted on a rear portion 102 of the subject vehicle 101 so as to extend transversely of the subject vehicle in a horizontal row, so as to be clearly visible by the driver of a following vehicle 103.

In addition to the normal brake lamps (not shown) of the subject vehicle, the subject vehicle 101 is provided with a red central high mounted stop lamp (CHMSL) 104.

A proximity sensor 60 is mounted on the rear portion 102 so as to be rearwardly facing and comprises a microwave device operable to emit a narrow beam of microwaves 105 to detect the presence of the following vehicle 103 and to determine the range r between the following vehicle and the rear portion 102 of the subject vehicle 101

A radio transmitter 106 is also mounted rearwardly facing on the rear portion 102 and is operable to transmit a directional transmission for reception by a radio receiver 107 mounted on the following vehicle 103. The following vehicle 103 is provided with a dashboard mounted indicator 108 which is responsive to signals received via the radio receiver 107 to provide the driver of the following vehicle with a dashboard visual display corresponding to a visual display provided by the array 2 of lamps. The dashboard indicator may therefore comprise a miniature array of lamps or any form of display providing an illuminated representation of an array of lamps.

As shown in FIG. 14, both the subject vehicle 101 and the following vehicle 103 have corresponding equipment so that the subject vehicle is provided with a radio receiver 107', a dashboard mounted indicator 108', and the following vehicle is provided with a radio transmitter 106', an array 2' of lamps, a CHMSL 104' and a proximity sensor 60'. It is envisaged that the above equipment should be standard equipment on all such vehicles in a given traffic situation.

As shown in FIG. 15, the display system 1 relies for its operation on a microprocessor 110 which receives an input from a speed sensor 109 of the subject vehicle 101 which determines the speed v of the subject vehicle derived from the rate of rotation of the road wheels. In this embodiment, the subject vehicle's ABS braking system includes a Hall effect sensor, the output of which is processed by circuitry forming part of the speed sensor 109 to provide a signal representative of road speed to the microprocessor 110.

The microprocessor 110 is also connected to the brake pedal switch 81 so as to receive an input B representative of whether the brake pedal is depressed or released.

The microprocessor 110 also receives an input from the proximity sensor 60, representative of the range r of the following vehicle.

The microprocessor 110 samples input data at a rate of 1000 cycles per second and is operable to update control of the lamp driving circuit 111 at this same rate, thereby defining the response time of the display system 1 at 0.001 seconds.

The microprocessor 110 provides an output to a lamp driving circuit 111 which is operable to selectively supply electrical power to each of the lamps forming the array 2, the microprocessor being operable to effect switching of the lamps via the lamp driving circuit to create visual patterns defining a series of distinct display modes which are referred to below with reference to a display mode parameter M having values 0, 1, 2, or 3. Corresponding data defining the display mode is also output from the microprocessor 110 to the radio transmitter 106 to be reconstituted in the radio receiver 107 and displayed on the dash board mounted indicator 108.

The CHMSL 104 is actuated independently of the microprocessor 110 and of the lamp driving circuit in response to actuation of the brake pedal switch 81.

The available display system modes will now be described. When the subject vehicle 101 is proceeding at speed and is not decelerating, each of the lamps in the array 2 is extinguished, M=0 thereby defining the OFF state of the display system. In this state the CHMSL 104 may be illuminated by actuation of the brake pedal, the CHMSL being independent of the array 2 and actuated in unison with the conventional brake lights (not shown) of the subject vehicle 101.

In a first display system mode, M=1, the array 2 of lamps is driven in a manner which generates a progressive brake warning (PBW) visual display in which the number of lamps illuminated increases with increasing severity of deceleration. As shown in FIG. 16, mild deceleration causes a central pair of lamps 10 and 11 to be illuminated. If the rate of deceleration is increased, a second pair of lamps 12 and 13 is also illuminated. Further increased deceleration causes a third pair 14 and 15 to be illuminated and finally a maximum indicated deceleration corresponds to the additional illumination of an outer pair 16 and 17.

First, second, third and fourth level of warning of the state of motion being one of deceleration are therefore indicated by the displays A, B, C and D respectively of FIG. 16. The CHMSL 104 is indicated as being illuminated in FIG. 16 in each of these displays although this not need necessarily be the case, if for example deceleration were effected other than by actuation of the foot brake.

The PBW visual display will be readily observed by the driver of the following vehicle 103, the nature of the visual display being such as to immediately convey to the driver of the following vehicle the severity of deceleration of the subject vehicle 101, thereby enabling the driver of the following vehicle to take appropriate braking or evasive action. A corresponding visual display is presented to the driver of the following vehicle by means of the dash board mounted indicator 108.

A second display system mode, M=2 is illustrated in FIG. 17 in which patterns of illumination A, B, C, D and E are sequentially and cyclically displayed to provide a vehicle stationary indication (VSI) to indicate to the driver of the following vehicle 103 that the subject vehicle 101 is either stationary or near stationary, in order to alert the driver to a potential hazard. This animated visual display is provided by illuminating the lamps and sequentially deactuating selected pairs of lamps to create a pattern cyclically moving symmetrically outwardly from the central portion of the row to both left and right end portions of the row. The cycle begins at pattern A of FIG. 17 where central lamps 10 and 11 are deactuated, then moving to pattern B where the second pair of lamps 12 and 13 are deactuated, the third pair 14 and 15 being deactuated at pattern C and the outer pair 16 and 17 being deactuated at pattern D. Pattern E of FIG. 17 displays all of the lamps simultaneously and is followed by pattern A to repeat the cycle.

This cycle of patterns gives the appearance of movement from the centre towards left and right extremities and gives the viewer a perception of the lights growing towards the viewer. Such a display has a deliberately high attention grabbing effect.

A third display system mode, M=3, is illustrated in FIG. 17 by pattern F which is continuously maintained to provide a static visual display in which only the outer pair 16 and 17 of the lamps are illuminated. The third display system mode is used to indicate to the driver of the following vehicle that the subject vehicle remains stationary or near stationary, the third display system mode being adopted in situations where the following vehicle is sensed to be in close proximity with the subject vehicle and it is appropriate to discontinue the animated display of the second display system mode in order to reduce the number of lamps illuminated, thereby reducing the likelihood of causing dazzle or annoyance to the driver of the following vehicle. It is therefore apparent that both the second and third display system modes provide VSI visual displays and corresponding visual displays are provided by the dashboard mounted indicator 108.

The second and third display system modes (M=2, M=3) provide first and second indications respectively of the state of motion of the subject vehicle being stationary, it being understood that the "stationary state" indications are appropriate to the vehicle speed being zero or close to zero.

The above visual displays are each recognisable unambiguously from one another and have been selected to be immediately recognisable as being different from any existing vehicle display. Both the PBW and VSI displays have been designed to be intuitively and instantly comprehended by the driver of a following vehicle 103, even if the driver has never before been exposed to such displays.

Operation of the display system in the first system mode M=1 is illustrated in FIGS. 18 and 19. FIG. 18 provides an upper graph of acceleration f against time for the subject vehicle, acceleration f being determined by calculation of the micro-processor 110 based on input values of speed v as measured by the speed sensor 109. The initial portion of the graph shows acceleration f decreasing sharply from positive acceleration to a negative value in response to heavy braking during which the brake pedal switch 81 is actuated. When the rate of deceleration equals a threshold $F_{1A}$, the system mode changes from 0 to 1 as illustrated in the lower portion of FIG. 18 in the graph of M against time. The array 2 of lamps is actuated such that pattern A of FIG. 16 is displayed, pattern A consisting of illumination of lamps 10 and 11. As the deceleration increases to a further threshold $F_{1B}$, the display changes to pattern B of FIG. 16 in which additionally lamps 12 and 13 are illuminated. Further increasing deceleration to cross thresholds $F_{1C}$ and $F_{1D}$ similarly changes the pattern through C and D of FIG. 16.

In the example of FIG. 18, the rate of deceleration subsequently begins to decrease (i.e. acceleration f increases back towards 0) such that a second set of thresholds $F_{2D}$ through $F_{2A}$ are crossed thereby changing the display to pattern C, B and A and finally to turn off the array of lamps when $F_{2A}$ is crossed, i.e. M is reset to 0. The thresholds $F_{2A}$ to $F_{2D}$ of the second set correspond to lower levels of deceleration than the respective thresholds of the series $F_{1A}$ to $F_{1D}$ respectively (i.e. $|F_{2A}|<|F_{1A}|$, etc.) as illustrated in greater detail in FIG. 19. Furthermore, each of the threshold values $F_{1A}$ to $F_{2D}$ is dependent on the value of speed v of the subject vehicle. The amplitudes of thresholds are linearly proportional to v as illustrated in the left and right hand portions of FIG. 19, the left hand portion illustrating the thresholds $F_{1A}$ to $F_{2D}$ corresponding to v=50 mph and the right hand portion of FIG. 19 illustrating the corresponding thresholds at v=15 mph.

The differences between the thresholds $F_{2A}$ to $F_{2D}$ and $F_{1A}$ to $F_{1D}$ are provided to avoid excessive switching between patterns of the PBW display resulting from insignificant fluctuations in the level of deceleration. The dependence of the threshold magnitude upon speed v automatically compensates for the need to provide a more significant level of warning to the driver of the following vehicle during high speed manoeuvres compared with the less significant level of warning required in relatively slowly moving traffic situations.

FIG. 20 illustrates graphically the manner in which the VSI display is actuated in dependence upon the value of speed v of the subject vehicle. The upper portion of FIG. 20 shows the variation of speed v against time for the subject vehicle decelerating to a halt and subsequently accelerating away. The display system is initially in the first display system first mode, M=1, in which the PBW display is actuated according to the value of deceleration. This is indicated by the lower portion of FIG. 20 in which the value of M is indicated graphically. When the value of speed v decreases to cross a first speed threshold $V_1$ corresponding to the subject vehicle being almost stationary, this is detected by the micro-processor software which changes the system mode to commence the VSI display (M=2) in accordance with the sequence described above with reference to FIG. 17, cyclically displaying patterns A to E. The subject vehicle subsequently becomes truly stationary when speed v=0, M=2 being sustained throughout this period in this example.

The subject vehicle subsequently moves off with speed v increasing progressively and passing through a second speed threshold $V_2$. This is detected by the micro-processor software which resets the display system mode to "OFF" (M=0), the VSI display thereby being discontinued. The VSI display may be actuated irrespective of whether the brake switch 81 is actuated.

In the preferred embodiment of the present invention, $V_1$=2 mph and $V_2$=5 mph.

FIG. 21 illustrates graphically the manner in which the VSI display depends upon the measured value of range r between the following vehicle and the subject vehicle. The upper portion of FIG. 21 shows an example of how r varies with time in a situation in which the subject vehicle is initially stationary. The following vehicle is initially beyond the range of the proximity device, then approaches from the rear in close proximity, and then the subject vehicle moves off slowly at a speed less than $V_2$, as in the case of a traffic queue.

As illustrated in the upper portion of FIG. 21, the measured value of range r is initially at a maximum value corresponding to no following vehicle having been sensed. The measured value of range r begins to decrease towards 0 when the following vehicle comes into range of the proximity sensor and progressively decreases until a first range threshold $R_1$ is crossed. At this point, the system mode parameter M as shown in the lower portion of FIG. 21 changes from M=2 (corresponding to the subject vehicle being stationary and the animated display being in progress) to M=3, thereby changing the VSI display to pattern F of FIG. 17 in which the outer pair of lamps 16 and 17 remain continuously illuminated in a static display.

Subsequently the subject vehicle moves off and the measured value of range r increases to a second range threshold $R_2$ thereby triggering a further change in the value of M from M=3 to M=2. The animate VSI visual display thereby resumes while the subject vehicle moves slowly forward at a speed of less than $V_2$. If alternatively the subject vehicle had accelerated to a speed greater than $V_2$ at the time of crossing the range threshold $R_2$, then the system mode parameter M would change to M=0, turning OFF the display. In the preferred embodiment, $R_1$=10 feet and $R_2$=20 feet.

By making $R_2$ greater than $R_1$, the display system is able to tolerate traffic queue situations in which the subject vehicle will repeatedly move forward to a further stopped position and the following vehicle will subsequently follow suit. In such traffic queue situations, it is desirable to avoid reverting unnecessarily to the animate VSI display since repeatedly viewing the animate VSI display at close proximity could cause annoyance to the driver of the following vehicle and is unnecessary.

The value of $V_2$ is made greater than $V_1$ for similar reasons, i.e. to allow the VSI display to be sustained during slow movement of the subject vehicle while still allowing $V_1$ to be relatively low in order to trigger the VSI display only when the subject vehicle is stopping.

FIG. 22 illustrates schematically and in simplified form a flow chart of software used in the microprocessor 110 in order to achieve the above described method of operation.

An initialising step 112 sets a vehicle state of motion parameter S to 0, thereby making the assumption that the subject vehicle is stationary when the microprocessor begins to run the process. Decision step 113 tests whether the vehicle's state of motion parameter has value S=1 or 0, S=1 corresponding to the vehicle being in motion, and the transition from S=0 to S=1 occurring when the measured speed v exceeds the second speed threshold $V_2$ at decision step 114. The transition from S=1 to S=0 occurs when the measured speed v is less than the first speed threshold $V_1$ at decisions step 115.

The value of acceleration f is calculated at step 116 and compared with the previous value of f to determine whether f is in increasing, i.e. whether the level of deceleration is decreasing. If decision step 117 determines that f is both negative and decreasing, i.e. increasing deceleration is occurring, the value of f is compared with the first acceleration thresholds $F_{1A}$ to $F_{1D}$ at comparison step 118 to select the appropriate level A, B, C, D of the PBW visual display. If however f is both increasing and negative, i.e. the level of deceleration is decreasing, f is compared with the second acceleration thresholds $F_{2A}$ to $F_{2B}$ at comparison step 119 and the level of warning corresponding to FIG. 16 level A, B, C, D of PBW visual display is set accordingly.

The comparison step 118 represents a subroutine which allows the level A, B, C, D of the PBW visual display to indicate increasing levels of PBW which are limited to one transition level at each 0.001 second cycle of the microprocessor, i.e. at each cycle the permitted transitions are OFF to A, A to B, B to C and C to D. The onset of the PBW visual display will always therefore be progressive.

The comparison step 119 however represents a subroutine which allows any transition between levels of PBW such that for example the visual display can be turned OFF in a single cycle.

In the above described system, the PBW display can be activated only if the brake switch 81 is actuated, this being determined at decision step 120.

This dependence on brake switch operation is a requirement of current legislation in certain territories. Ideally however, the dependence on brake actuation would be removed.

A further decision step 121 is provided to test whether a system type parameter T=1 or 0, T=1 corresponding to the above described system in which the brake switch 81 has an overriding influence on the PBW visual display. To remove this feature, the software can be adapted by setting T=0 so that decision step 120 is bypassed. The value of T is input to the microprocessor via a user accessible key switch to thereby enable the system to be adapted for operation in accordance with local legislature i.e. according to whether local legislature requires the brake switch to have an overriding effect on any indication of deceleration to following drivers.

For situations in which the vehicle's state of motion parameter S=0, i.e. the vehicle is truly stationary or nearly stationary as defined above with reference to FIG. 20 and with reference to speed thresholds $V_1$ and $V_2$, the measured value of range r between the following vehicle and the subject vehicle is compared with range threshold R at decision step 122 (the flow chart is here simplified to omit a subroutine determining the value of R to be either $R_1$ or $R_2$ as described above with reference to FIG. 21). If as a result of this comparison a following vehicle is determined to be within the defined proximity range, the VSI animate display is initiated at process step 123 to thereby provide a visual display indicating that the subject vehicle is stationary. If no following vehicle is detected within the proximity threshold defined above, the VSI static display is initiated at process step 124 (the flow chart is further simplified here to omit a subroutine which prevents the animate VSI display changing to the static VSI display until three complete cycles of the animate display have been completed).

FIGS. 23 to 25 illustrate alternative configurations of lamps for use in accordance with the present invention to provide the VSI and PBW visual displays.

In FIG. 23, lamps 10 to 17 form a horizontal linear array 2 corresponding to the array 2 of FIG. 16 but in which the CHMSL 104 is vertically displaced relative to the remaining lamps so as to achieve visual prominence. In FIG. 24, the configuration is varied to include the CHMSL 104 in co-linear relationship with the remaining lamps 10 to 17. Unlike the configuration of FIG. 16 however, there is no longitudinal displacement between the CHMSL 104 and the lamps 11 to 17 so that, when not illuminated, the lamps appear to form a uniform linear array.

FIG. 25 shows an alternative configuration in which lamps 10 to 17 are grouped as respective left and right hand vertical columns of lamps with the CHMSL being located intermediate and above the columns. During the PBW visual display, lamps 10 to 17 are progressively illuminated in pairs and in an upward direction to indicate progressively increasing levels of deceleration.

A further alternative embodiment will now be described with reference to FIG. 26 using corresponding reference numerals to those of preceding figures where appropriate for corresponding elements. FIG. 26 shows a display system 130 in which a lamp driving circuit 111 drives an array 2 of lamps 10 to 17 and a central stop lamp i.e. CHMSL 104.

The microprocessor 110 actuates the CHMSL 104 whenever the vehicle's service brake is operated, as detected by brake switch 81, thereby providing the familiar braking display in which the CHMSL 104 is illuminated whenever the vehicle brake lights are illuminated. The CHMSL 104 is however additionally capable of being illuminated under the control of software in the microprocessor 110 so as to be included as part of the PBW display providing an indication of the state of motion as being one of deceleration, the animated display providing a first indication of the state of motion as being stationary and the static display providing the second indication of the state of motion being stationary when the following vehicle is in proximity to the subject vehicle. Whether or not the CHMSL 104 is to be included in any one of the above displays is determined by the setting of control switches 131 which allow a number of software options to be indicated to the microprocessor 110. Although in general it will be preferable to include the CHMSL 104 in such displays, compliance with statutory legislation may prohibit such control of the CHMSL 104 in certain territories and it is therefore advantageous to allow the software to be adapted by means of such control switches 131.

The display system 130 also includes an ambient light sensing circuit 132 which is operable to determine the average ambient light level over a period of ten minutes, thereby enabling the microprocessor 110 to regulate the intensity of the lamps 11 to 17, 104 by means of a regulating circuit 103 such that under low light level conditions the intensity of the lamps is reduced. This provides the advantage, particularly during night driving, of preventing the driver of a following vehicle from being dazzled by the brightness of the lamps.

The display system 130 has a speed sensor 109 forming part of the subject vehicle ABS system and providing a digital signal 134 to the microprocessor having a pulse frequency which is proportional to vehicle speed, as detected by means of a Hall effect sensor 135 in proximity with a slotted disk 91 rotatable in unison with a road wheel of the subject vehicle. The display system 130 also has the facility of providing the microprocessor 110 with an analogue signal 136 representative of vehicle speed and derived by means of a digital to analogue converter 137 which takes the output of the Hall effect sensor 135 and converts the digital signal 134 to an analogue signal 136. Operation on the basis of either the digital signal 134 or analogue 136 is selected by setting of one of the control switches 131.

When utilising the digital signal 134, the microprocessor 110 determines the measure of vehicle speed v by counting clock pulses of the microprocessor between each pulse of the digital signal 134. When using a relatively fast microprocessor this will generally be a satisfactory method of operation. If however a relatively slow microprocessor is selected, for example on cost grounds, satisfactory operation may not be possible if the frequency of the digital signal 134 is relatively high, as in the case of large diameter slotted disk 91 having a high density of features sensed by the sensor 135. Under such circumstances, operation using the analogue signal 136 would be preferable and selected by appropriate switching of the control switches 131. These switches may also be used to adapt the operation of the microprocessor when using different types of disk 91 or when using road wheels of different diameter.

The display system 130 also includes a set of trim potentiometers 138, each constituted by 10 kOhm variable resistors providing a variable voltage input to the microprocessor 110 and manually set to continuously control the value of operating parameters of the software. Four of the trim potentiometers 138 are used to set values of thresholds $F_{1A}$, $F_{1B}$, $F_{1C}$, and $F_{1D}$. A further one of the trim potentiometers 138 is used to set a speed gain parameter G which is a constant of proportionality determining the relationship between the above deceleration thresholds with subject vehicle speed v. A further two of the trim potentiometers 138 are used to set speed threshold values $V_1$ and $V_2$.

The microprocessor 110 in the display system 130 includes software which, when indicating the level of warning in the PBW display, introduces a delay following the selection of a lower level of warning before turning off the appropriate lamps of the display, the software thereby effectively emulating a low pass filter in the instruction to turn off the lamps. This feature ensures that the warning level of the PBW display persists for a sufficiently long period to be recognised by the driver of the following vehicle. In the flow chart of FIG. 22 for example, this step would be inserted immediately following step 119.

A final one of the trim potentiometers 138 is used to set a time constant τ which defines the delay in turning off lamps of the PBW display in response to decreasing levels of deceleration.

The display system 130 includes a proximity sensor 60 which provides an analogue output 139 to the microprocessor 110 and being indicative of a measurement of range r between the subject vehicle and following vehicle.

In each of the above described embodiments, the number of pairs of lamps making up the display and capable of being separately energised may be more or less than the four pairs shown in the preferred embodiments, with a minimum of two pairs being required.

The lamps in the preferred embodiments have been shown as being of the same size. The lamps may alternatively be configured such that at least some of the pairs of lamps differ in size from lamps of other pairs and for example lamps 10, 12, 14 and 16 may be of progressively increasing size.

The microprocessor 110 may be a dedicated processor chip or alternatively microprocessor control may be provided as one of several functions performed by a multipurpose microprocessor installed in the vehicle for managing operating or safety systems of the vehicle.

As an alternative to sensing vehicle speed using the ABS system, any suitable voltage output which is speed dependent may be sensed from the vehicle electrical system, such as for example the circuitry driving the vehicle's tachometer.

Similarly, as an alternative to calculating acceleration f from the measured value of vehicle speed v, a measured value of f may be derived directly by means of an accelerometer having a separate input to the microprocessor.

A further alternative is to sense vehicle speed independently of wheel rotation by means of an active speed sensor such as for example a microwave device determining ground speed by analysing the Doppler shift of reflected radiation. Acceleration may then be determined from the rate of change of measured speed.

In the preferred embodiment, radio transmitter 106 and receiver 107 are used to provide a dashboard display in the following vehicle 103. These features may be omitted so as to rely solely upon the visual display of the lamps 10 to 17. Alternatively, the dashboard display may be relied upon exclusively i.e. without the provision of the lamps 10 to 17.

The proximity sensor 60 may alternatively utilise a sonar beam and detector circuit. The proximity sensor may be provided integrally with a sensor for use during reversing of the subject vehicle and operable to indicate to the driver of the subject vehicle the proximity of objects rearward of the vehicle.

The above described embodiment utilises a second set of acceleration thresholds $F_{2A}$ to $F_{2D}$ in order to avoid excessive fluctuation in PBW visual display. Alternatively, a single set of acceleration thresholds $F_{1A}$ to $F_{1D}$ may be utilised in combination with a response time limiting subroutine which measures the elapsed time during which a particular level A, B, C or D of PBW display persists and inhibits relaxation to a level of display indicating a lower level of deceleration until a predetermined response time has elapsed. In the flow chart of FIG. 22, the comparison step 112 would therefore be replaced by a suitable response time limiting subroutine.

As a further alternative, the use of the second set of acceleration thresholds $F_{2A}$ to $F_{2D}$ may be retained in addition to the response time limiting subroutine to provide a more comprehensive mechanism for controlling fluctuation in the PBW display.

The circuit arrangement shown schematically in FIG. 15 provides for the CHMSL to be energised independently of the lamp driving circuit 111. Alternatively, the CHMSL may be connected to the lamp driving circuit such that the lamp driving circuit controls actuation of both the lamps 10 to 17 and the CHMSL 104.

The lamps 10 to 17 and the CHMSL 104 may then be housed integrally in the same housing structure and may share a common wiring loom.

The CHMSL 104 may in the embodiment of FIG. 26 be illuminated during at least a part of the VSI animate (or static) display, independently of the brake switch, in order to further enhance the VSI visual display. In particular, the static display may be provided by illuminating the CHMSL together with the outer pair of lamps 16, 17.

The microprocessor 110 may be programmed to illuminate the CHMSL whenever deceleration is sensed so that the CHMSL is actuated independently of the vehicle brake lights. This is advantageous for example in the case of vehicles having retarders which operate independently of the braking system.

The acceleration thresholds $F_{1A}$ to $F_{1D}$ in the embodiments of FIGS. 14 to 26 have amplitudes $|F_{1A}|$ etc which are proportional to the measured speed v, for example $|F_{1A}|=A+Gv$ where A is a constant and G is a speed gain parameter. G is typically a positive constant value, adjustable in the embodiment, of FIG. 26 by means of the trim potentiometer 138. The acceleration thresholds may alternatively be determined to be a non-linear function of v, the speed gain G being a function of speed v and being tailored to provide optimum compensation for vehicle speed to take account of increased stopping distances and the pronounced effect of reaction time at high speed. Values of G may for example be stored in a look up table.

It may also be desirable for G to have negative values if it is found to be appropriate for the amplitude of deceleration threshold to increase with decreasing speed.

The value of the speed threshold $V_1$ utilised to trigger the transition from the moving to stationary values of the vehicle state of motion parameter S (decision step 115 of FIG. 22) may alternatively be enhanced to be greater than the value of speed threshold $V_2$ (decision step 114). This may be appropriated for example where it is perceived to be important to initiate the VSI visual display as early as possible. Appropriate restructuring of the software would be required.

It may alternatively be appropriate for $V_1$ and $V_2$ to have the same value and the software adapted correspondingly.

The lamps 10 to 17 may include conventional filament lamps of the type currently utilised in vehicle brake lamp systems, such filament lamps generally being simple to individually replace in the event of failure. Alternatively, arrays of light emitting diodes may be utilised in order to take advantage of the fast rise time of such devices (i.e. the time to reach 90% of maximum light output), thereby enhancing the speed of response of the display. This may be important when it is necessary to initiate the PBW visual display at high speed.

The embodiment of FIG. 26 may alternatively comprise a proximity sensor 60 defining a single range threshold R and having a digital output to the microprocessor 110 which indicates either the presence or absence of a following vehicle in proximity with the subject vehicle. Such a modified proximity sensor may have an adjustably settable range threshold R.

Any of the above embodiments may alternatively comprise a proximity sensor 60 in the form of a continuous wave doppler shift radar which provides an output indicative of relative velocity between following vehicle and subject vehicle. Such a sensor would respond to the approach of the following vehicle, thereby providing a progressively increasing output which could be identified as being representative of the following vehicle entering into close proximity with the subject vehicle. Since however the sensor would provide no output in a static position in which both vehicles were stationary, it would also be necessary to incorporate a latching facility such that the continued proximity of the following vehicle remained indicated to the microprocessor software until such time as relative movement corresponding to separation of the vehicles was subsequently sensed. The unlatching step could also be triggered by the subject vehicle's speed v exceeding the second speed threshold $V_2$.

In the above embodiments, the dashboard mounted indicator 108 may additionally or alternatively comprise an audible warning device.

What is claimed is:

1. A method of indicating the state of motion of a subject vehicle to a driver of a following vehicle by means of an array of lamps mounted on the subject vehicle and operable to produce a visual display indicative of the state of motion, the method comprising:
   a. sensing a measure of velocity of the subject vehicle by operation of a vehicle motion measuring means; and
   b. determining whether the measure of velocity is less than a reference value, and;
   c. when so determined, illuminating said lamps in a time dependent sequence to produce an animated visual display indicative of the state of motion as being stationary.

2. An apparatus for indicating a state of motion of a subject vehicle to a driver of a following vehicle by means of an array of lamps mounted in use, on the subject vehicle and operable to produce a visual display indicative of the state of motion, the apparatus comprising:
   a. vehicle motion sensing means for sensing a measure of velocity of the subject vehicle;
   b. means for determining whether the measure of velocity is less than a reference value; and
   c. means for illuminating said lamps in a time dependent sequence in response to the measure of velocity being determined to be less than the reference value to produce an animated visual display on the array of lamps indicative of the state of motion as being stationary.

* * * * *

UNITED STATES PATENT AND TRADEMARK OFFICE
CERTIFICATE OF CORRECTION

PATENT NO  : 6,133,852
DATED      : October 17, 2000
INVENTOR(S): Mark Christopher Tonkin It is certified that error appears in the above-identified patent and that said Letters Patent is hereby corrected as shown below:

On the face page of the patent, please delete the assignee "Design Technology; Innovation Limited, both of Sussex, United Kingdom" and insert --Design Technology & Innovation Limited, of Sussex, United Kingdom--.

Signed and Sealed this

Twenty-second Day of May, 2001

Attest:

NICHOLAS P. GODICI

Attesting Officer

Acting Director of the United States Patent and Trademark Office